United States Patent
Fukushima et al.

(10) Patent No.: US 9,110,297 B2
(45) Date of Patent: Aug. 18, 2015

(54) IMAGE DISPLAY DEVICE

(71) Applicant: KABUSHIKI KAISHA TOSHIBA, Tokyo (JP)

(72) Inventors: Rieko Fukushima, Tokyo (JP); Yuzo Hirayama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 13/782,334

(22) Filed: Mar. 1, 2013

(65) Prior Publication Data

US 2013/0286476 A1   Oct. 31, 2013

(30) Foreign Application Priority Data

Apr. 27, 2012   (JP) .................. 2012-103438

(51) Int. Cl.
  *G02B 27/22* (2006.01)
(52) U.S. Cl.
  CPC .................. *G02B 27/2214* (2013.01)
(58) Field of Classification Search
  None
  See application file for complete search history.

(56) References Cited

U.S. PATENT DOCUMENTS

2012/0062990 A1   3/2012   Okamoto
2012/0182611 A1   7/2012   Fukushima et al.

FOREIGN PATENT DOCUMENTS

| JP | 3940456 | 4/2007 |
| JP | 4271155 | 3/2009 |
| JP | 2012-58599 | 3/2012 |

OTHER PUBLICATIONS

Notice of Rejection issued by the Japanese Patent Office on Apr. 22, 2014, for Japanese Patent Application No. 2012-103438, and English-language translation thereof.
Notice of Rejection issued by the Japanese Patent Office on Oct. 28, 2014, for Japanese Patent Application No. 2012-103438, and English-language translation thereof.

*Primary Examiner* — Jade R Chwasz
(74) *Attorney, Agent, or Firm* — Finnegan, Henderson, Farabow, Garrett & Dunner, L.L.P.

(57) ABSTRACT

According to an embodiment, the display unit includes pixels, each pixel includes sub-pixels having different colors, arranged in a matrix in a first direction and in a second direction substantially orthogonal to the first direction. The light beam controller faces the display unit, extends in a third direction making an angle smaller than 90° with the second direction, includes light beam control elements periodically arranged at a first pitch in the first direction and at a second pitch in the second direction, and can control direction of light beams from the display unit. The first and second pitches make a substantially equilateral triangle by joining the nearest same-color sub-pixels. When "s" represents the number of the sub-pixels included in the pixels along the first direction, the first pitch is 5/s or greater of a third pitch of each pixel.

6 Claims, 18 Drawing Sheets

L1

L2
= L1 × n
= N

θ
= atan(L1/L2)
= atan(1/n)

5a  5c
  5b 5a  5c
  5b

L1=1.55, L2=9.0

L1=2.8, L2=9.0

L1=2.0, L2=9.0

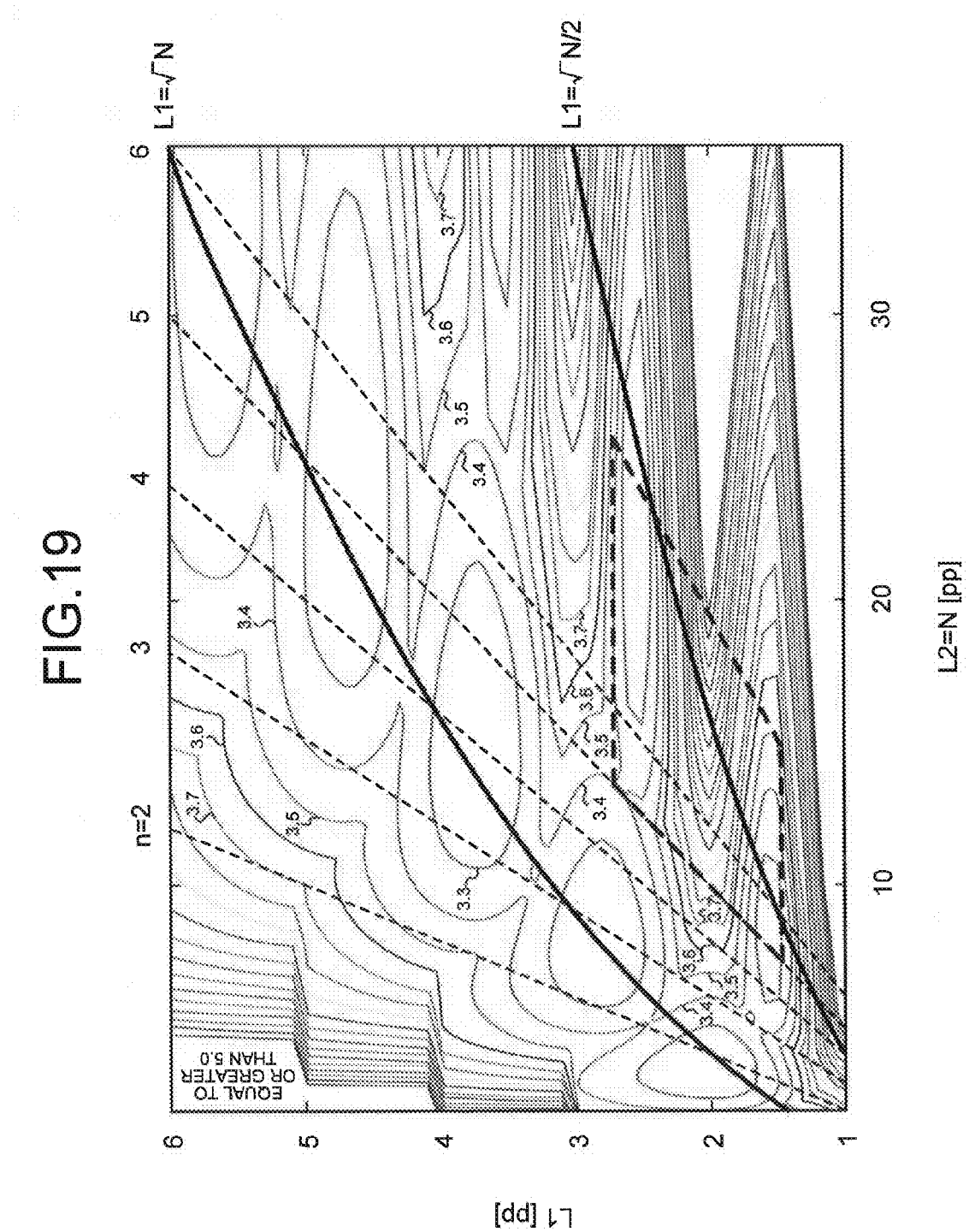

IMAGE DISPLAY DEVICE

CROSS-REFERENCE TO RELATED APPLICATIONS

This application is based upon and claims the benefit of priority from Japanese Patent Application No. 2012-103438, filed on Apr. 27, 2012; the entire contents of which are incorporated herein by reference.

FIELD

Embodiments described herein relate generally to an image display device.

BACKGROUND

In recent years, there is a demand particularly for flat-panel-type three-dimensional picture display devices that do not require special glasses. In one type of such three-dimensional picture display devices, a light beam control unit is disposed facing a display panel (display unit) such as a direct-view-type liquid crystal display unit or a projection-type liquid crystal display, and the light beam from the display unit is controlled to be directed toward the observer.

The light beam control unit has a function by which, regarding a particular position on the light beam control unit, pictures appear corresponding to the angle of observation. Regarding a case in which only the left-right parallax (the horizontal parallax) is applied, a specific example is a structure in which linear light beam control elements such as slits (parallax barrier) or cylindrical lenses are disposed in the horizontal direction on a periodic basis. As a representative structure, a barrier or a lenticular sheet is known. In each pixel of the display unit is displayed the color and brightness information (parallax information) corresponding to the direction that is observed via the light beam control elements, and a collection of parallax images corresponding to a single aperture area is called an element image. Herein, the expression can be any one of the following: the observer views pictures corresponding to the observation position via the aperture area; and the light beams emitted via the light beam control elements constitute three-dimensional images.

The techniques of combining a display unit and a light beam control unit are categorized into binocular display, multi-view display, super multi-view display (super multi-view condition of multi-view display), and integral imaging (hereinafter, referred to as "II") depending on the parallax count (where parallax is the difference in vision due to viewing from a different direction) and depending on the design guideline. In binocular display, stereoscopic viewing is achieved by applying binocular parallax with two parallax images. In contrast, in other techniques, kinematic parallax is applied in varying degrees. Thus, such a picture is called "three-dimensional picture" in distinction from "stereoscopic picture" achieved in binocular display. The abovementioned method of observing parallax images through the light beam control elements has essentially the same fundamental principle as the principle of integral photography (IP) that is a known technology.

Of the techniques described above, for example, the II technique has a feature that the viewpoint position can have an enhanced degree of freedom by increasing the parallax count; and stereoscopic viewing can be performed over a relatively wide range (wide visible area). The parallax count can be increased according to the pixel count of pixels constituting an element image. However, since there is an upper limit to the resolution of the display unit, the interval between the light beam control elements grows larger. That leads to deterioration in the resolution of the three-dimensional pictures.

In order to suppress the deterioration in the resolution of the three-dimensional pictures, a one-dimensional direct-view-type unaided-eye three-dimensional display device is known in which the direction of presenting the parallaxes is limited to the horizontal direction, and the parallaxes are not presented in the vertical direction (up-down direction). However, in a one-dimensional direct-view-type unaided-eye three-dimensional display device, there remain known issues such as deterioration in the resolution in only the horizontal direction or occurrence of moire due to the optical interference between the periodic structure of the light beam control elements and the periodic structure of the pixels (aperture areas and light interception areas) that are arranged in a matrix in the display unit. Typically, with the aim of improving the resolution balance or with the aim of removing the moire in an effective manner, a technique is known for tilting the light beam control elements.

Meanwhile, in a one-dimensional direct-view-type unaided-eye three-dimensional display device, the image quality deteriorates depending on the arrays of colors (color arrays) observed through the light beam control elements. For example, in the case of color arrays in which same colors are arranged in the horizontal direction, stripes of same colors appear thereby leading to deterioration in the image quality.

BRIEF DESCRIPTION OF THE DRAWINGS

FIG. 19 is a diagram for explaining lens pitches in each of two modes.

DETAILED DESCRIPTION

Figure 1:
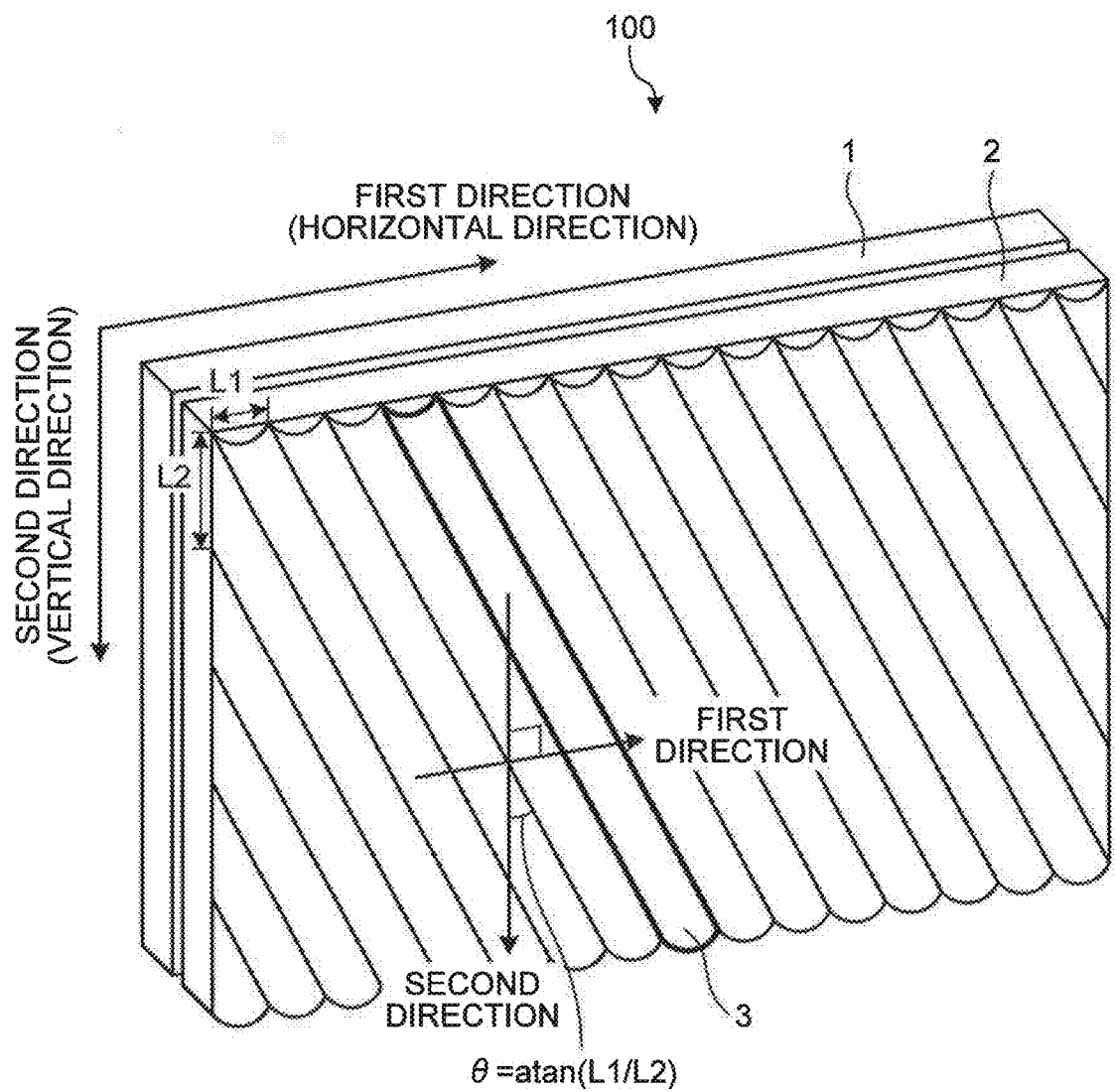
FIG. 1 is a diagram illustrating an image display device according to a first embodiment.

According to an embodiment, an image display device includes a display unit and a light beam controller. The display unit includes pixels, each of which includes a plurality of sub-pixels having different colors, arranged in a matrix in a first direction and in a second direction substantially orthogonal to the first direction, and displays parallax images having parallax with respect to each other. The light beam controller faces the display unit and includes light beam control elements arranged on a periodic basis at a first pitch in the first direction and at a second pitch in the second direction. Each light beam control element extends in a third direction making an angle smaller than 90° with the second direction. The light beam controller is configured to be capable of controlling the direction of light beams emitted from the display unit. The first pitch and the second pitch are configured to make a triangle, which is obtained by joining the nearest sub-pixels having the same color and is close to an equilateral triangle. When "s" represents the number of the sub-pixels included in the pixels along the first direction, the first pitch is equal to or greater than 5/s of a third pitch of each pixel.

Various embodiments will be described in detail below with reference to the accompanying drawings. In each embodiment described below, an image display apparatus is a one-dimensional direct-view-type unaided-eye three-dimensional display device that can implement, for example, the II technique or the multi-view display technique and that can allow the observer to view three-dimensional pictures by displaying a plurality of parallax images having mutually different parallaxes. The examples of the image display device include a television (TV), a personal computer (PC), a smartphone, or a digital photo frame that enables viewing of three-dimensional pictures with the unaided eye. Meanwhile, in the embodiments described below, the constituent elements referred to by the same reference numerals perform the same functions. Hence, the explanation of those constituent elements is not repeated in each embodiment.

First Embodiment

FIG. 1 is a schematic view of an image display device 100 according to a first embodiment. As illustrated in FIG. 1, the image display device 100 includes a display unit 1 and a light beam control unit 2. Herein, the light beam control unit 2 is disposed at a position facing the display unit 1, and controls the outgoing direction of the light beam coming out from each sub-pixel of the display unit 1. In the example illustrated in FIG. 1, the light beam control unit 2 is disposed on the front face of the display unit 1. Moreover, the light beam control unit 2 extends in a linear manner in a third direction that is tilted with respect to a second direction (the vertical direction) by an angle θ which is smaller than 90°; and has light beam control elements 3 arranged on a periodic basis at a first pitch L1 in a first direction (the horizontal direction) that is substantially orthogonal to the second direction and at a second pitch L2 in the second direction. The angle θ is expressed as arctan (L1/L2). In the following explanation, a tilt coefficient n (=L2/L1) that is expressed as the ratio of the second pitch L2 to the first pitch L1 is used as the parameter indicating the tilt of the light beam control elements 3.

Meanwhile, in the example illustrated in FIG. 1, the light beam control unit 2 is a lenticular sheet on which a plurality of cylindrical lenses is arranged to function as the light beam control elements 3 for emitting light beams. However, that is not the only possible case. Alternatively, for example, the light beam control unit 2 can be a parallax barrier having a plurality of slits functioning as the light beam control elements 3.

Figure 2:
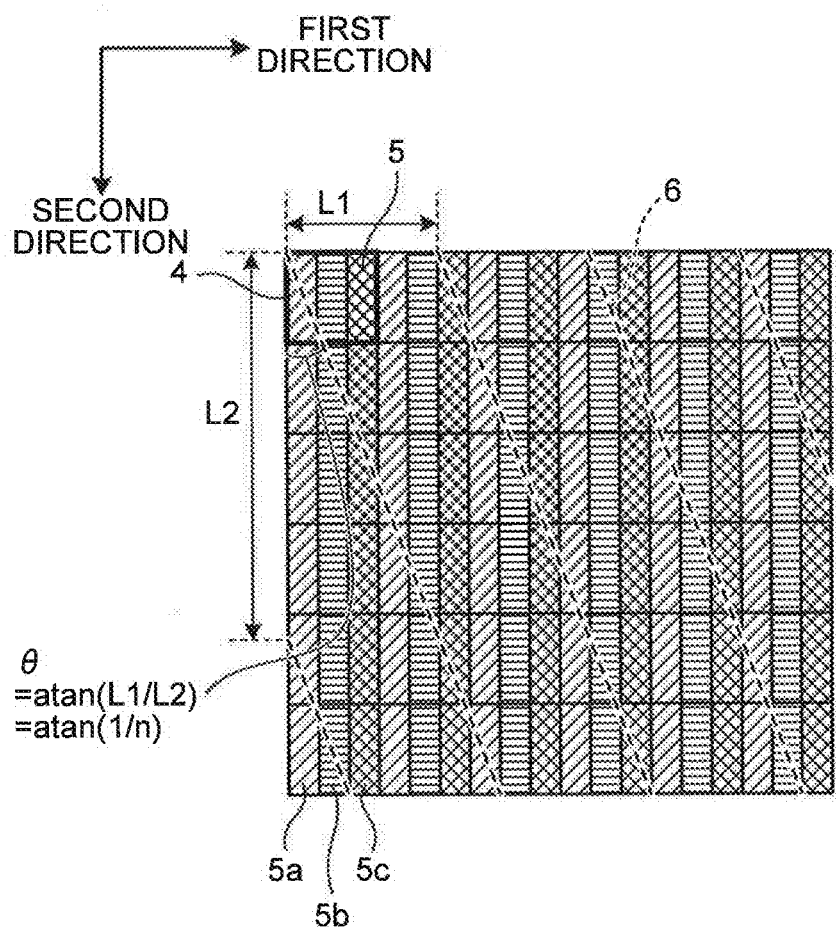
FIG. 2 is a diagram illustrating an enlarged portion of the image display device.

FIG. 2 is a diagram illustrating an enlarged portion of the display unit 1 and the light beam control unit 2. In FIG. 2, dashed lines 6 represent ridge lines of the cylindrical lenses that function as the light beam control elements 3. As illustrated in FIG. 2, in the display unit 1, pixels 4 are arranged in a matrix along the first direction and the second direction. Generally, the pixels 4 have a substantially square shape. In the following explanation, "pp" represents the width of the pixels 4 in the first direction as well as in the second direction. In other words, in the display unit 1, it can be said that the pixels 4 are arranged on a periodic basis with the pitch pp in the first direction and with the pitch pp in the second direction. Meanwhile, the pitch pp of the pixels 4 corresponds to a "third pitch" mentioned in claims. Thus, in the following explanation, the pitch pp of the pixels 4 is sometimes referred to as the third pitch pp.

Each pixel 4 includes a plurality of sub-pixels 5 having mutually different colors. In the example illustrated in FIG. 2, each pixel 4 includes a sub-pixel 5a of red (R) color, a sub-pixel 5b of green (G) color, and a sub-pixel 5c of blue (B) color. However, that is not the only possible case. In the example illustrated in FIG. 2, each sub-pixel 5 is rectangular in shape with 1:3 as the ratio of the sides in the first direction to the sides in the second direction. In the first direction, the sub-pixels are repeatedly arranged in the sequence of red (R), green (G), and blue (B) colors. Consequently, in the second direction, same color components are arranged (forming a "longitudinal stripe arrangement"). Moreover, in each sub-pixel 5 is displayed a parallax image that corresponds to the direction from which the display unit 1 is observed through the light bean control unit 2. With that, depending on the viewpoint position of the observer, the parallax image viewed by one eye of the observer is different than the parallax image viewed by the other eye.

Figure 3:
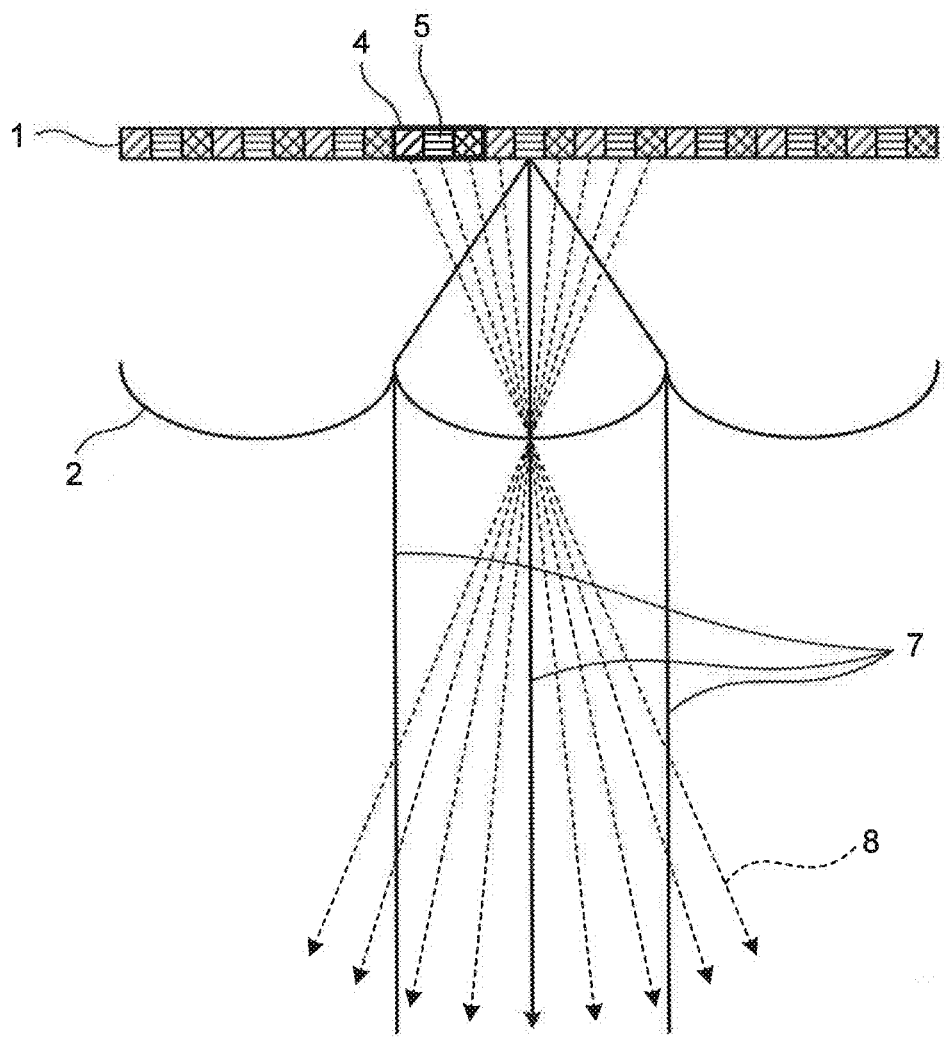
FIG. 3 is a diagram illustrating a portion of the transverse section of the image display device.

FIG. 3 is a schematic view illustrating an enlarged portion of the transverse section of the display unit 1 and the light beam control unit 2. In the example illustrated in FIG. 3, regarding the light coming out from one of the sub-pixels 5 that are arranged in the display unit 1, solid lines 7 represent the range within which the outgoing direction of the light is controlled via the light beam control unit 2 (herein, a lens) as well as represent the principal ray of that light. Regarding the light coming out of the neighboring sub-pixels 5, dashed lines 8 represent only the principal rays of that light. When parallax images corresponding to the outgoing directions of the light are displayed in the sub-pixels 5, it is found that a lens can behave like pixels in a three-dimensional display device in which pixel information (parallax images) is switched according to the direction of observation. In other words, the light beams emitted through lenses reproduce a three-dimensional picture.

Figure 4A:
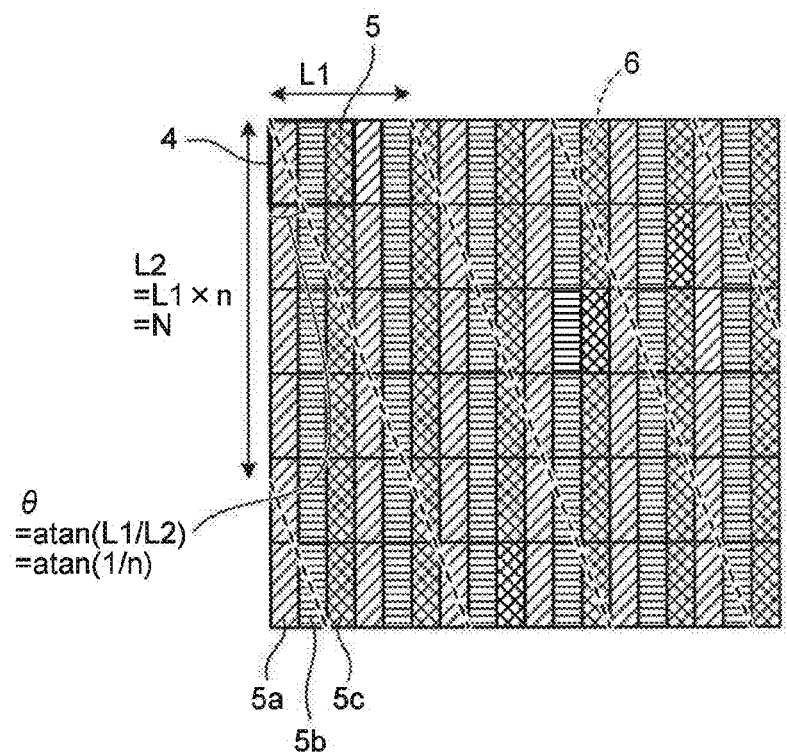
FIGS. 4A and 4B are diagrams for explaining color arrays.
Figure 4B:
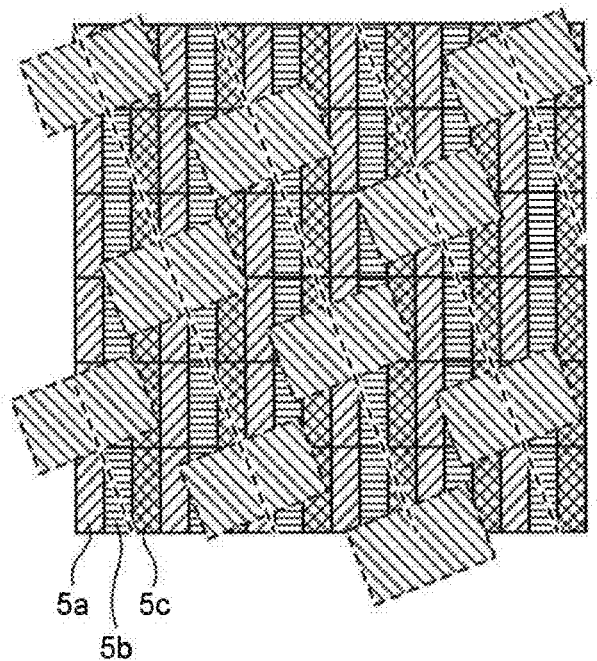

FIGS. 4A and 4B are diagrams for explaining arrays of colors (color arrays) that are observed through the light beam control unit 2. In FIGS. 4A and 4B, the dashed lines 6 represent the positions at which the light beam control elements 3 face each other. In the example illustrated in FIGS. 4A and 4B, the first pitch L1 (the width in the first direction) of the light, beam control elements 3 is set to 1.66×pp; while the second pitch L2 (the width in the second direction) of the light beam control elements 3 is set to 4.0×pp. Thus, the tilt coefficient n is expressed as 1.66/4.0 (≅50/12.0). In the case when the light beam control elements 3 are cylindrical lenses, the sub-pixels 5 at the matching positions with the light beam control elements 3 have colors that are seen in a stretched manner in the perpendicular direction to the ridge lines 6 of the lenses. In FIG. 4B is illustrated a condition in which one of the colors (in this example, red (R)) of the sub-pixels 5 is seen in a stretched manner through the cylindrical lenses. Regarding other colors, with the relative positions remaining intact, only the positions seen in a stretched manner get shifted. Hence, that explanation is omitted.

The following explanation is given regarding the parallax count (the number of parallax images) in the present specification. Depending on the observation position of the viewer, the dashed lines 6 (the positions at which the light beam control elements 3 face each other) illustrated in FIGS. 4A and 4B are shifted to left or right (shifted in the first direction). That is equivalent to a shift in the upward or downward direction (in the second direction). That is, observing the images, which are displayed on the display unit 1, through the light beam control elements 3 leads to deterioration in the resolution of three-dimensional pictures to 1/L2 (for example, if L2=1 (with "pp" as the unit), the periods of observation through the light beam control elements match with the pitch pp in the second direction of each of the sub-pixels 5a, 5b, and 5c of RGB colors, and thus, the resolution does not deteriorate); and each of the sub-pixels 5a, 5b, and 5c can display pictures in mutually different directions equal to L2 in number. Thus, if "N" represents the parallax count, then N=L2 is satisfied.

Figure 5A:
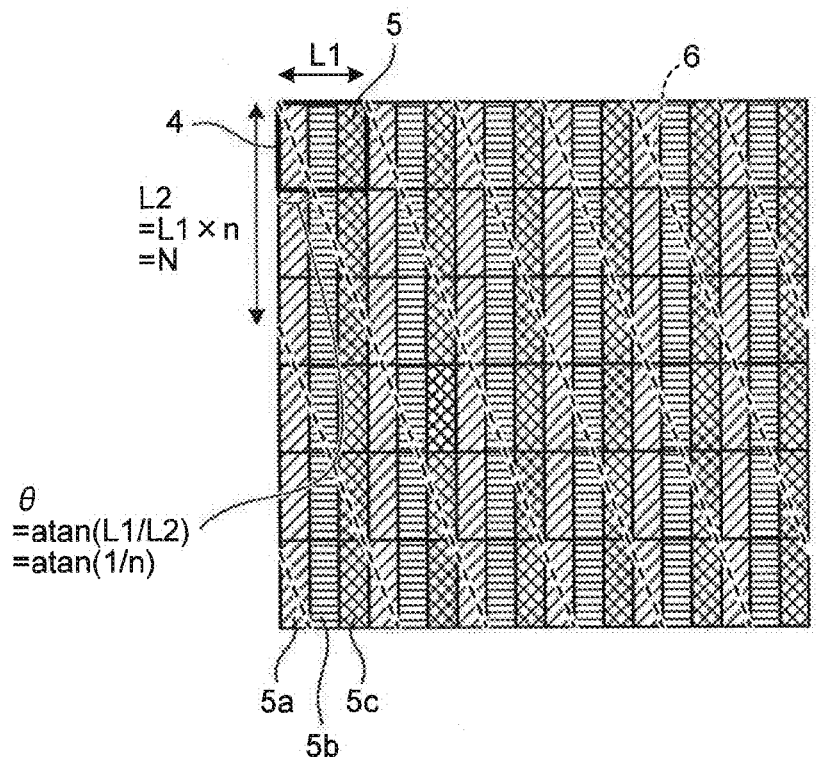
FIGS. 5A and 5B are diagrams for explaining color arrays.
Figure 5B:
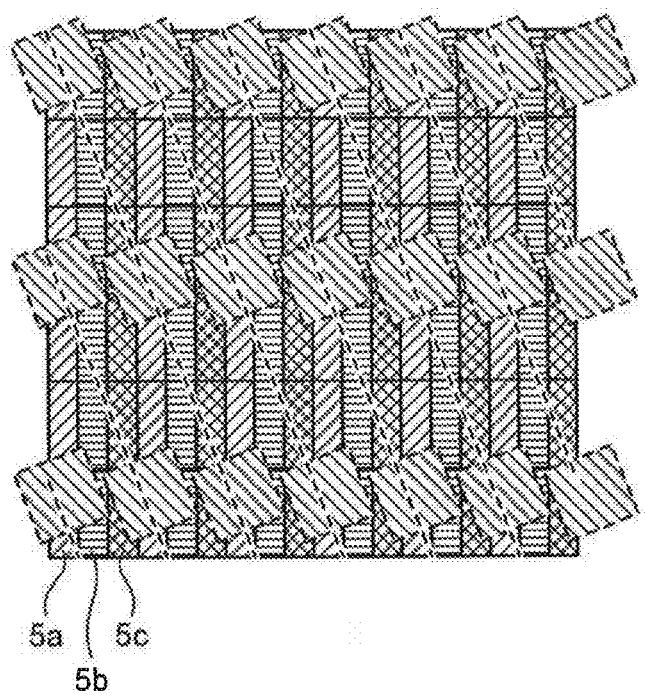

FIGS. 5A and 5B are diagrams for explaining the color arrays observed under different conditions than in the example illustrated in FIGS. 4A and 4B. In the example illustrated in FIGS. 5A and 5B, the first pitch L1 of the light beam control elements 3 is set to 1.0×pp; while the second pitch L2 of the light beam control elements 3 is set to 2.4×pp. Thus, the tilt coefficient n is expressed as $1.0/2.4$ ($\cong 5.0/12.0$). Thus, as compared to the example illustrated in FIGS. 4A and 4B, the angle θ is the same but the first pitch L1 is different. In FIG. 5B is illustrated a condition in which one of the colors (in this example, red (R)) of the sub-pixels 5 is seen in a stretched manner through the cylindrical lenses. Thus, as can be understood from FIG. 5B too, under the conditions (L1=1.0×, L2=2.4×pp, tilt coefficient n=1.0/2.4) illustrated in FIGS. 5A and 5B, the color arrays are such that same colors observed through the cylindrical lenses are arranged in the horizontal direction (the first direction). Thus, under the conditions illustrated in FIGS. 5A and 5B, moire of same colors occurs in the horizontal direction thereby leading to deterioration in the image quality.

Figure 6A:
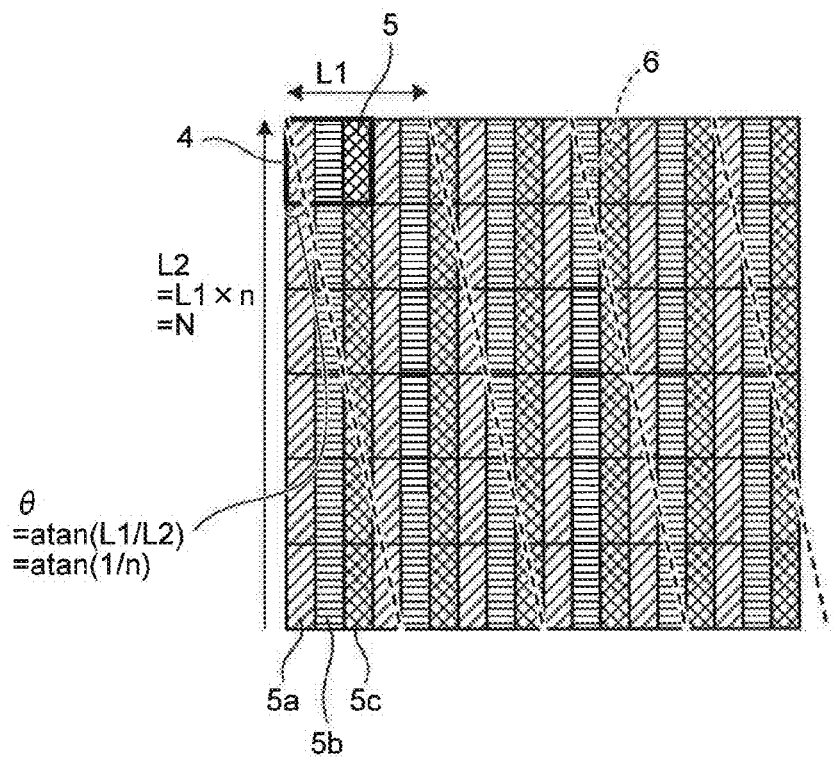
FIGS. 6A and 6B are diagrams for explaining color arrays.
Figure 6B:
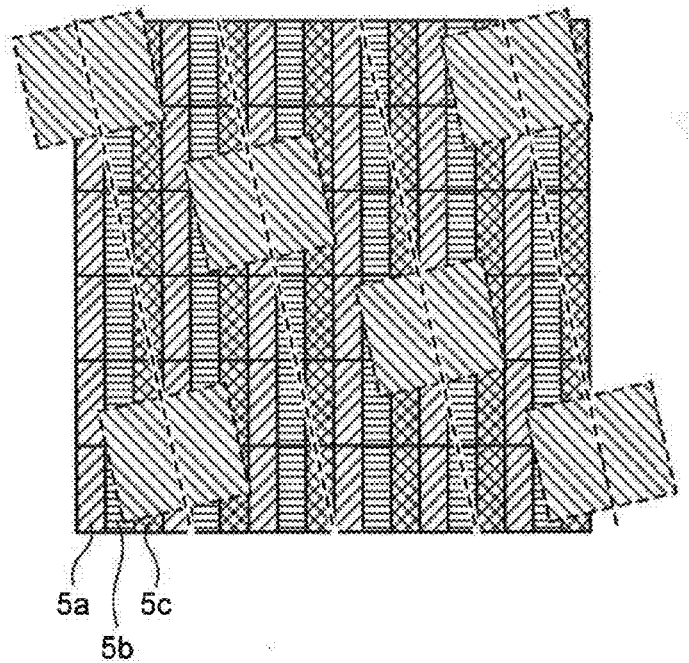
Figure 7A:
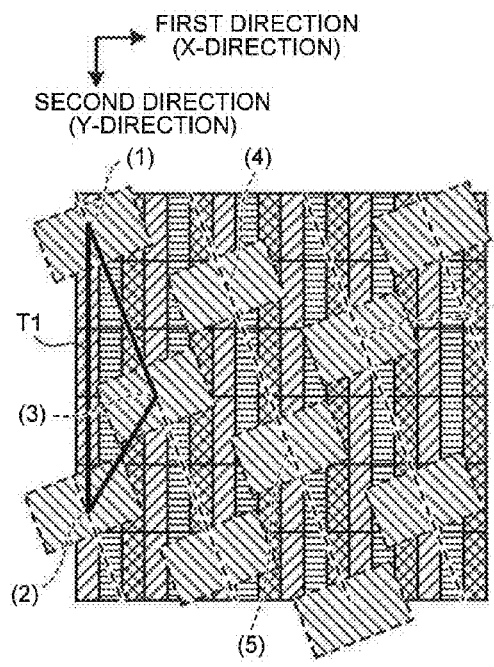
FIGS. 7A to 7D are diagrams for explaining triangles obtained by joining the nearest sub-pixels having the same color.
Figure 7B:
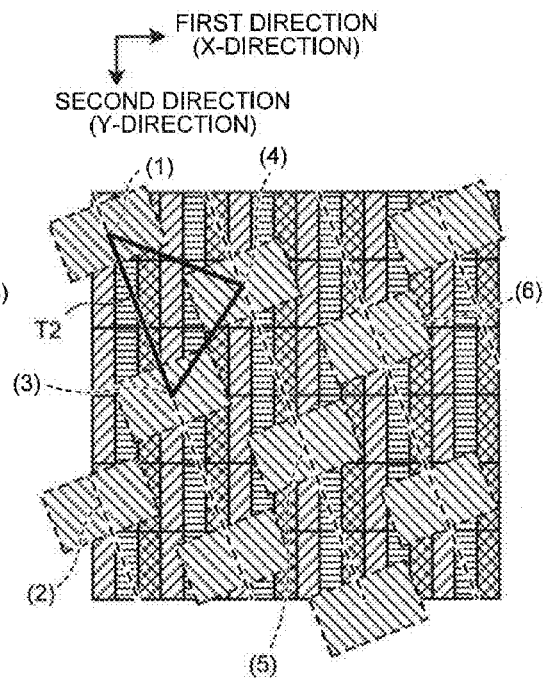
Figure 7C:
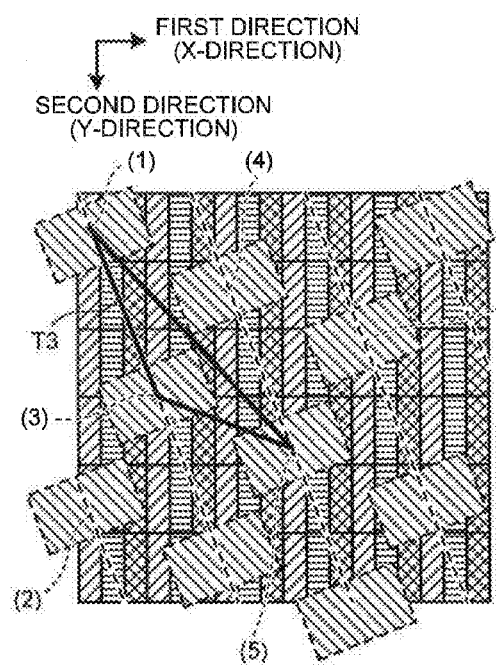
Figure 7D:
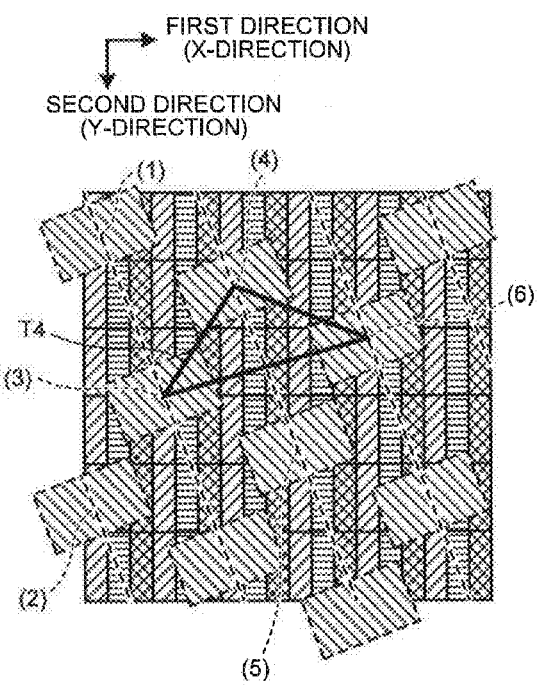

FIGS. 6A and 6B are diagrams for explaining the color arrays observed under different conditions than in the examples illustrated in FIGS. 4A, 4B and FIGS. 5A and 5B. In the example illustrated in FIGS. 6A and 6B, the first pitch L1 of the light beam control elements 3 is set to 1.66×pp; while the second pitch L2 of the light beam control elements 3 is set to 7.0×pp. Thus, the tilt coefficient n is expressed as $1.66/7.0$ ($\cong 5.0/21.0$). Thus, as compared to the example illustrated in FIGS. 4A and 4B, the angle θ is different but the first pitch L1 is same. In FIGS. 6A and 6B are illustrated a condition in which one of the colors (in this example, red (R)) of the sub-pixels 5 is seen in a stretched manner through the cylindrical lenses. Thus, as can be understood from FIG. 6B, under the conditions (L1=1.66×, L2=7.0×pp, tilt coefficient n=1.66/7.0) illustrated in FIGS. 6A and 6B, the color arrays are such that same colors observed through the cylindrical lenses are arranged in a downward-sloping manner in the right-hand direction.

As described above, the color arrays observed through the light beam control unit 2 undergo changes according to the combination of the first pitch L1 and the second pitch L2. If the color arrays (distribution) of same colors that are observed through the light beam control unit 2 can be made to have isotropic nature (delta-arrangement-like nature), it becomes possible to considerably enhance the image quality of the one-dimensional direct-view-type unaided-eye three-dimensional display device. As illustrated in FIGS. 5A and 5B, if the first pitch L1 is an integer multiple of the third pitch pp (the pitch of the pixels 4), then the color arrays have same colors arranged horizontally. Hence, it can be easily understood that the arrangement of same colors does not become isotropic in nature. In light of that, if "p" is considered to be a natural number and if the first pitch L1 is shifted from being an integer multiple of the third pitch pp (for example, if L1=pp× (p+0.5)), then it is projected that vicinally-positioned same colors can be arranged to have more isotropic nature (delta-arrangement-like nature).

As explained below, in the first embodiment, a method of evaluating the isotropic nature is devised; and such a combination of the first pitch L1 and the second pitch L2 (parallax count N) is selected that enables achieving color arrays having superior isotropic nature. Herein, a high degree of isotropy means that the color arrays of each color of RGB that are observed through the light beam control elements 3 are distributed without any bias. Thus, it is desirable that a triangle obtained by joining the nearest sub-pixels having the same color is close to an equilateral triangle. This is the same approach to the approach of implementing delta arrangement in a low-resolution display with the aim of improving the display properties.

Thus, in the first embodiment, with the aim of improving the image quality of the image display device 100, the first pitch L1 and the second pitch L2 are set to values which ensure that the triangles that are viewed through the light beam control elements 3 when a plurality of parallax images is displayed on the display unit 1 and that are obtained by joining the nearest sub-pixels having same colors are close to equilateral triangles. The details of that are given below.

As illustrated in FIGS. 7A to 7D, from among the sub-pixels having the same color (in this example, red (R)) that are observed through the light beam control elements 3, joining the nearest sub-pixels having the same color results in the formation of four types of triangles (T1, T2, T3, and T4). Herein, in the first embodiment, it was found that the area of a quadrangle obtained by joining the nearest four sub-pixels having the same color is equal to N (with $pp^2$ as the unit). That dovetails with the point that the quadrangle represents the pixels of a three-dimensional picture; and, when the pixel sizes increases N-fold, the resolution decreases to 1/N at the same time. Thus, by taking into account the fact that the area of each of the abovementioned four types of triangles is half of the area of the quadrangle, the area of each triangle becomes equal to N/2. Thus, in order to ensure that the triangles are close to equilateral triangles, the criterion is to have the shortest outer circumference. In the first embodiment, from among the triangles obtained by joining the nearest sub-pixels having the same color, the triangle having the shortest outer circumference is extracted; and the isotropic nature in the lens design is evaluated using the outer circumference value of the extracted triangle. The details of that are given below.

In the example illustrated in FIGS. 7A to 7D, assume that the first direction represents the x-direction and the second direction represents the y-direction. Then, in FIGS. 7A to 7D, the x-y coordinates of a point (1) are expressed as (0, 0); the x-y coordinates of a point (2) are expressed as (0, −L2); the x-y coordinates of a point (3) are expressed as (1, −n); and the x-y coordinates of a point (4) are expressed as (ROUNDUP (L1, 0), −(ROUNDUP(L1-0)−L1)×n). Herein, "ROUNDUP" represents a function for rounding up a numerical value to a specified number of digits, and is expressed as "ROUNDUP (numerical value, number of digits)". Meanwhile, in FIGS. 7A to 7D, the x-y coordinates of a point (5) are expressed as "x-y coordinates of point (3)+{(x-y coordinates of point (4))− (x-y coordinates of point (1))}"; and the x-y coordinates of a point (6) are expressed as "2×(x-y coordinates of point (4))". Using these values, the outer circumference value is obtained for each of the following triangles: the triangle T1 that is obtained by joining the points (1), (2), and (3); the triangle T2 that is obtained by joining the points (1), (3), and (4); the triangle T3 that is obtained by joining the points (1), (3), and (5); and the triangle T4 that is obtained by joining the points (3), (4), and (6). Then, the isotropic nature is evaluated using the value of the shortest outer circumference. Meanwhile, there are various methods to determine the position inside a sub-pixel corresponding to the vertex of a triangle. For example, the median point of a sub-pixel can be considered to be the vertex of a triangle, or a vertex of a sub-pixel can be considered to be the vertex of a triangle.

Figure 8:
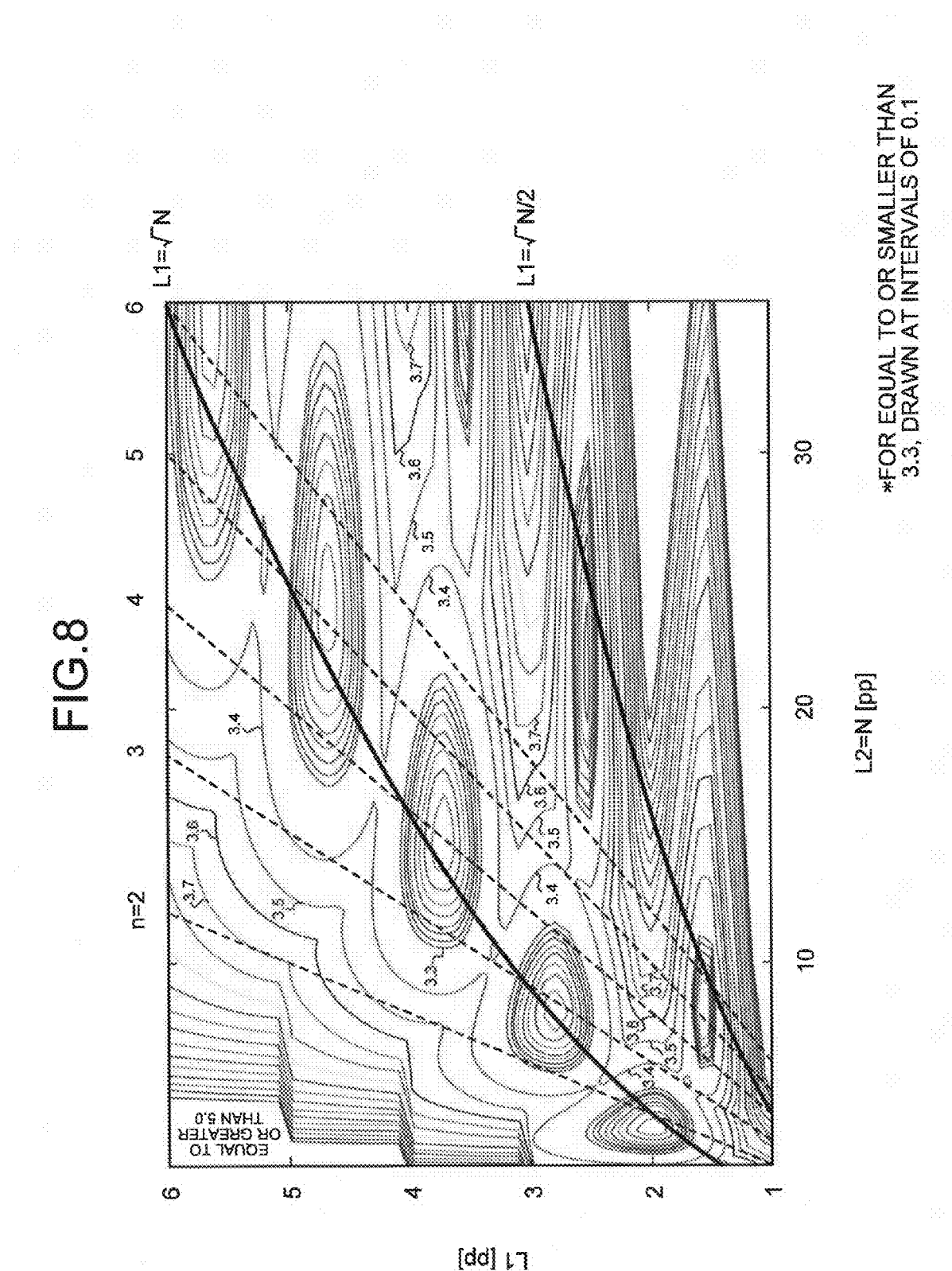
FIG. 8 is a diagram illustrating a result of plotting evaluation values with combinations of a first pitch and a second pitch.

However, if the parallax count N increases, it leads to an increase in the outer circumference value of a triangle that is obtained by joining the nearest sub-pixels having the same color. As a result, it is not possible, to make comparison with different lens designs. In that regard, in the first embodiment, the outer circumference value of a triangle obtained by joining the nearest sub-pixels having the same color is normalized with the parallax count N. More particularly, the attention was focused on the fact that, with any parallax count N, each triangle obtained by joining the nearest sub-pixels having the same color has the area expressed as N/2. Accordingly, it was found that normalization can be performed by dividing the outer circumference value of a triangle by $N^{1/2}$. Such a normalized value is called "evaluation value". FIG. 8 is a diagram illustrating an exemplary result of plotting evaluation values, which are obtained by dividing the outer circumference of a triangle (the triangle having the shortest outer circumference from among the triangles obtained by joining the nearest sub-pixels having the same color) by $N^{1/2}$, with respect to combinations of the first pitch L1 and the second pitch L2. In the example illustrated in FIG. 8, for each evaluation value, a contour line is illustrated that is obtained by connecting the plotting result of the combinations of the first pitch L1 and the second L2 for which that evaluation value is obtained. The numerical value appended to each contour line represents the evaluation value corresponding to that contour line. Meanwhile, in the example illustrated in FIG. 8, the contour line for each evaluation value has a different color.

Based on the result, illustrated in FIG. 8, test production was performed under each lens design condition and evaluation was done regarding three-dimensional pictures. Then, it was found that, when the evaluation value is equal to 3.5, the triangles that are observed through the light beam control elements 3 and that are obtained by joining the nearest sub-pixels having the same color are closer to equilateral triangles; and the image quality of the image display device 100 can be improved. Moreover, it was found that, when the evaluation value is equal to 3.4, the triangles that are obtained by joining the nearest sub-pixels having the same color are more closer to equilateral triangles than in the case when the evaluation value is equal to 3.5; and the image quality of the image display device 100 is further improved. Furthermore, it was found that, when the evaluation value is equal to 3.3, the triangles that are obtained by joining the nearest sub-pixels having the same color are more closer to equilateral triangles than in the case when the evaluation value is equal to 3.4; and no deterioration in the image quality was recognizable. Moreover, it was found that, when the evaluation value is equal to 3.25, the triangles that are obtained by joining the nearest sub-pixels having the same color are more closer to equilateral triangles (become substantially equilateral triangles) than in the case when the evaluation value is equal to 3.3; and the image quality of the image display device 100 is further improved.

Thus, the lower the evaluation value, the more closer are the triangles, which are obtained by joining the nearest sub-pixels having the same color, to equilateral triangles and the more improvement can be obtained in the image quality of the image display device 100. As can be understood from FIG. 8, the areas having superior isotropic nature are discretely found near $L1=^{1/2}$ and $L1=N^{1/2}/2$.

As described above, in order to achieve color arrays having superior isotropic nature, it is desirable to select such a combination of the first pitch L1 and the second pitch L2 (parallax count N) that has the evaluation value equal to or smaller than 3.5. Alternatively, it is also possible to select such a combination of the first pitch L1 and the second pitch L2 that has the evaluation value equal to or smaller than 3.4. Still alternatively, it is also possible to select such a combination of the first pitch L1 and the second pitch L2 that has the evaluation value equal to or smaller than 3.3. When the evaluation value is equal to or smaller than 3.3, no deterioration in the image quality is recognizable and the image quality of the image display device 100 can be improved by a large margin. Moreover, it is also possible to select such a combination of the first pitch L1 and the second pitch L2 that has the evaluation value equal to or smaller than 3.25. When the evaluation value is equal to or smaller than 3.25, the triangles that are observed through the light beam control elements 3 and that are obtained by joining the nearest sub-pixels having the same color become substantially equilateral triangles. Hence, that is especially effective in improving the image quality.

Figure 9A:
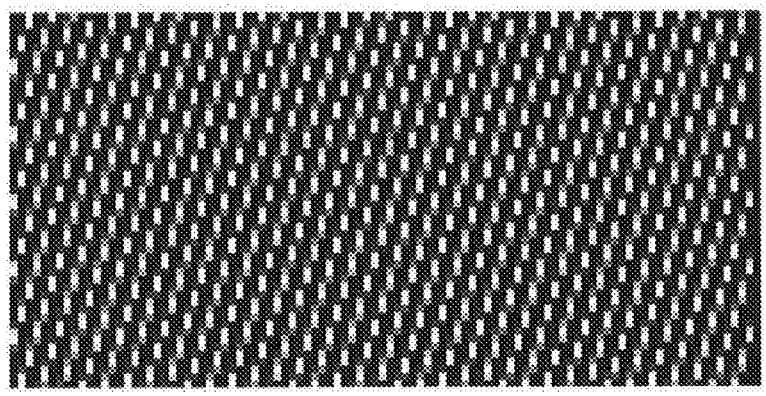
FIGS. 9A to 9C are diagrams illustrating specific aspects of color arrays.

Given below is the explanation with reference to a specific example. Under a condition in which the first pitch L1 is equal to 1.55×pp and the second pitch L2 is equal to 9.0×pp (i.e., with a combination for which the evaluation value is equal to or smaller than 3.3); when a lenticular sheet designed to have the focal, point matching with the pixels 4 was superposed on the display unit 1 for observation, it was confirmed that color arrays having superior isotropic nature are achieved as illustrated in FIG. 9A.

Figure 9B:
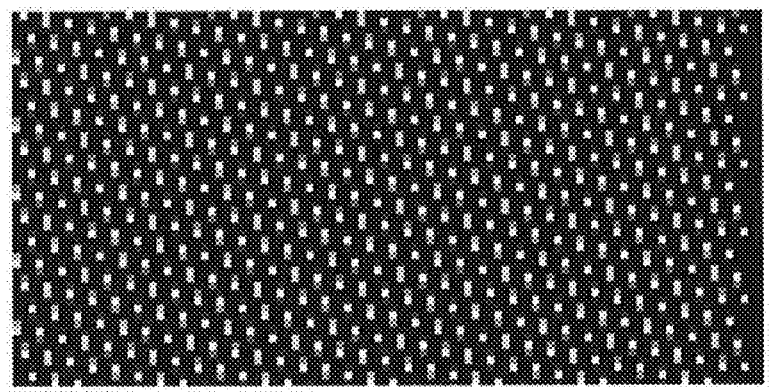
Figure 9C:
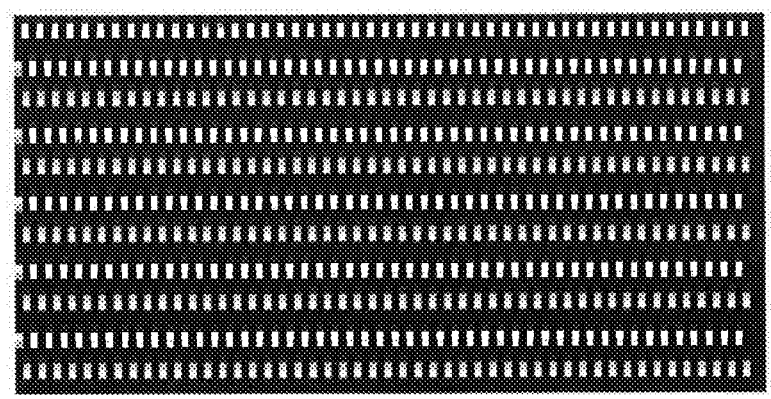

Moreover, under a condition in which the first pitch L1 is equal to 2.80×pp and the second pitch L2 is equal to 9.0×pp (i.e., with a combination for which the evaluation value is equal to or smaller than 3.25); when a lenticular sheet designed to have the focal point matching with the pixels 4 was superposed on the display unit 1 for observation, it was confirmed that color arrays having superior isotropic nature are achieved as illustrated in FIG. 9B.

As a comparison example, under a condition in which the first pitch L1 is equal to 2.0×pp and the second pitch L2 is equal to 9.0×pp (i.e., with a combination for which the evaluation value exceeds 3.5); when a lenticular sheet designed to have the focal point matching with the pixels 4 was superposed on the display unit 1 for observation, it was confirmed that color arrays having same colors arranged in the horizontal direction (i.e., color arrays that are inferior in isotropic nature) are achieved as illustrated in FIG. 9G.

As described above, by ensuring that the first pitch L1 and the second pitch L2 have values with which the triangles that are observed, through the light beam control elements 3 and that are obtained by joining the nearest sub-pixels having the same color are close to equilateral triangles (for example, by ensuring that the first pitch L1 and the second pitch L2 have values for which the evaluation value is equal to or smaller than 3.5), it becomes possible to achieve color arrays having superior isotropic nature.

Figure 10A:
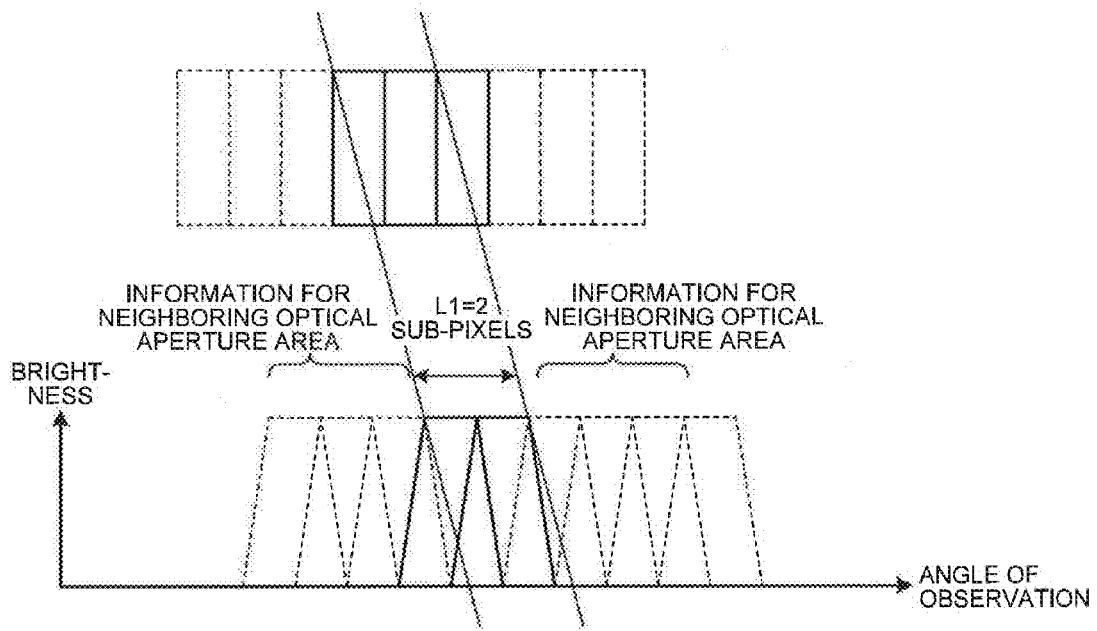
FIGS. 10A to 10C are diagrams for explaining conditions that enable separation of horizontal parallaxes.

Herein, in order to achieve the horizontal parallax, it is necessary to have at least two or more sub-pixels 5 in the horizontal direction (the first direction) with respect to a single light beam control element 3. As is the case in the first embodiment, when the lenses are disposed in a tilted manner, there occurs a crosstalk phenomenon in which the light beams coming out from the sub-pixels 5 displaying a particular parallax image gets mixed with the light beams coming out from the sub-pixels 5 displaying another parallax image. In FIG. 10A is illustrated an example in which a single pixel includes three sub-pixels 5 arranged in the first direction (the horizontal direction). As illustrated in FIG. 10A, in a configuration in which two sub-pixels 5 are arranged in the horizontal, direction with respect to a single light beam control element 3, the amount of crosstalk is too large to be able to sufficiently separate off the parallax images.

Figure 10B:
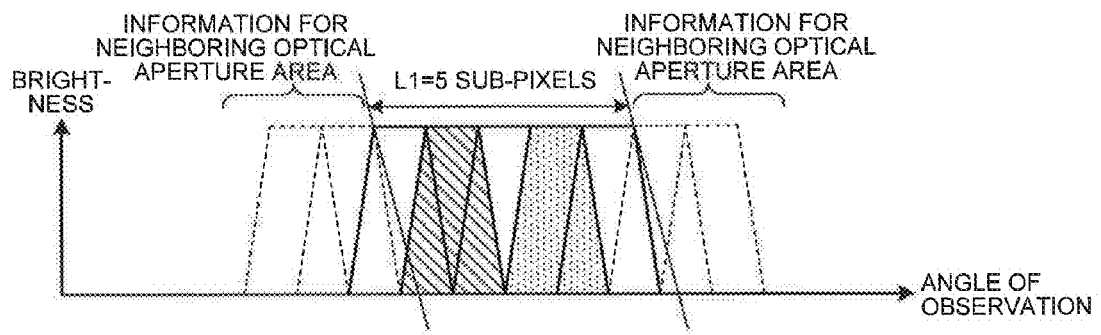

In that regard, in the first embodiment, assuming that a single pixel includes "s" number of sub-pixels in the first direction (the horizontal direction); a configuration is adopted in which five or more sub-pixels 5, which include the central pixel, are arranged in the horizontal direction for the purpose of separating parallaxes. That is, a configuration is adopted in which the first pitch L1 is equal to greater than pp×5/s. With such a configuration, it was found that the parallax images can be separated off to a satisfactory extent. For example, in the case when a single pixel includes three sub-pixels 5 arranged in the first direction (the horizontal direction), it is desirable to adopt a configuration in which the first pitch L1 is equal to or greater than pp×5/3 ($\cong$1.67×pp). As illustrated in FIG. 10B, if the configuration is such that five sub-pixels 5 are arranged in the horizontal direction with respect to a single light beam control element 3, then the parallax images on the right and the left can be separated off to a sufficient extent.

Figure 10C:
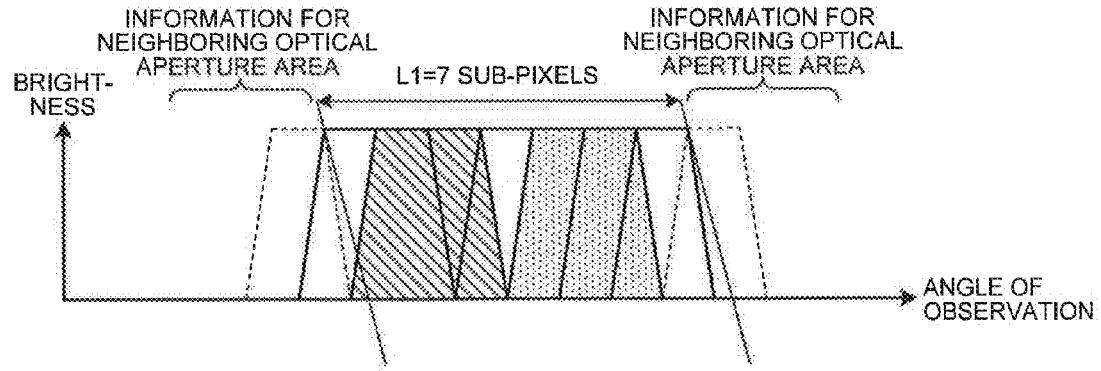

It is more desirable to adopt a configuration in which seven or more sub-pixels 5 are arranged in the horizontal direction with respect to a single light beam control element 3. That is, it is more desirable to adopt a configuration in which the first pitch L1 is equal to greater than pp×7/s. That makes it possible to also provide the continuous kinematic parallax. For example, if a single pixel includes three sub-pixels 5 arranged in the first direction (the horizontal direction), then it is desirable to adopt a configuration in which the first pitch L1 is equal to or greater than pp×7/3 ($\cong$2.33×pp). As illustrated in FIG. 10C, if the configuration is such that seven sub pixels 5 are arranged in the horizontal direction with respect to a single light beam control element 3, then it becomes possible to also provide the continues cinematic parallax. Meanwhile, in FIGS. 10A to 10C, the horizontal axis represents the observation angle (i.e., the angle between the normal line of the display unit 1 and the direction of observation), while the vertical axis represents brightness.

Figure 11:
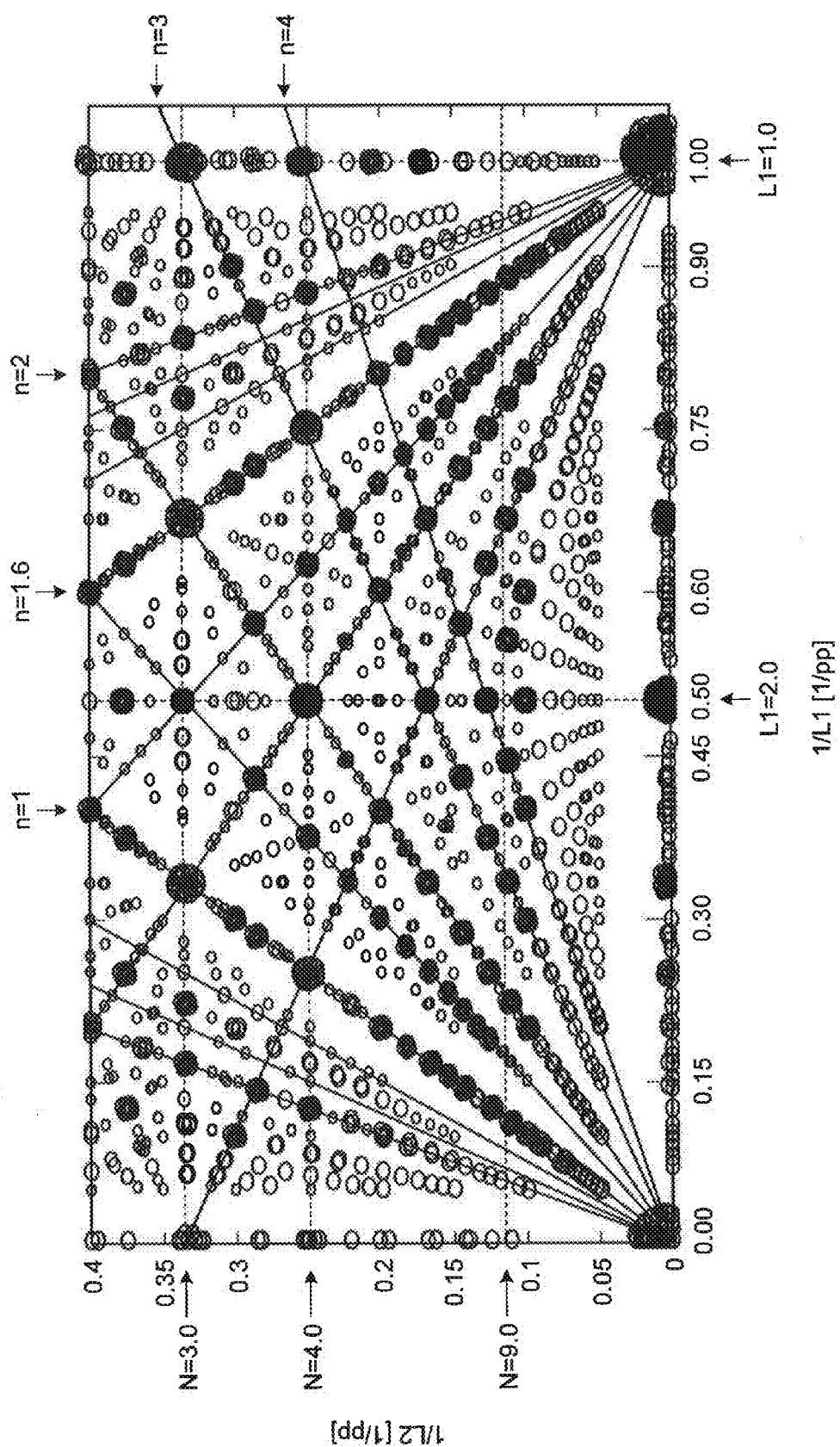
FIG. 11 is a diagram illustrating a result of plotting evaluation values with combinations of the first pitch and the second pitch occurring moire.

Given below is the explanation of criteria for avoiding the occurrence of moire. FIG. 11 is a diagram illustrating an exemplary result of plotting such combinations of the first pitch L1 and the second pitch L2 which result in the occurrence of moire. As can be understood from FIG. 11, moire occurs easily under each of the following conditions: tilt coefficient n=integer; tilt coefficient n=integer+0.5; tilt coefficient n=integer+0.33; and tilt coefficient n=integer+0.67. In that regard, in the first embodiment, in order to avoid the occurrence of moire, it was found to be desirable to set the tilt coefficient n to such a value that makes n×m (m=1, 2, 3) a non-integer.

As described above, in the image display device 100 according to the first embodiment, the first pitch L1 and the second pitch L2 have values which ensure that the triangles that are observed through the light beam control elements 3 and that are obtained by joining the nearest sub-pixels having the same color are close to equilateral triangles (for example, the first pitch L1 and the second pitch L2 have values for which the evaluation value is equal to or smaller than 3.5). Moreover, the first pitch L1 is equal to or greater than 5/s (where, "s" represents the number of sub-pixels included in the pixels along the first direction that constitute a single pixel) of the third pitch pp (the pitch of the pixels 4). Hence, it becomes possible to separate off the horizontal parallaxes to a sufficient extent while achieving color arrays having superior isotropic nature. That results in an enhancement in the image display device 100. Furthermore, since the first, pitch L1 and the second pitch L2 have values which make n×m (m=1, 2, 3) a non-integer, it becomes possible to avoid the occurrence of moire.

Second Embodiment

Given below is the explanation of a second embodiment. Herein, as compared to the first embodiment, the second embodiment differs in the point that a liquid crystal GRIN lens array (where GRIN stands for gradient index), which electrically controls a liquid crystal director and thus enables making changes in the lens effect or enables ON/OFF switching, is used as a light beam control unit. Moreover, in the second embodiment, in each of a first mode and a second mode having different refractive index distributions, the first pitch L1 (the pitch in the first direction) and the second pitch L2 (the pitch in the second direction) of the liquid crystal GRIN lens array formed in that particular mode have values which ensure that the triangles that are viewed through light beam control elements (i.e., through liquid crystal GRIN lenses) and that are obtained by joining the nearest sub-pixels having same colors are close to equilateral triangles. With that in each of the first mode and the second mode, it becomes possible to achieve color arrays having superior isotropic nature. The details of that are given below.

Figure 12:
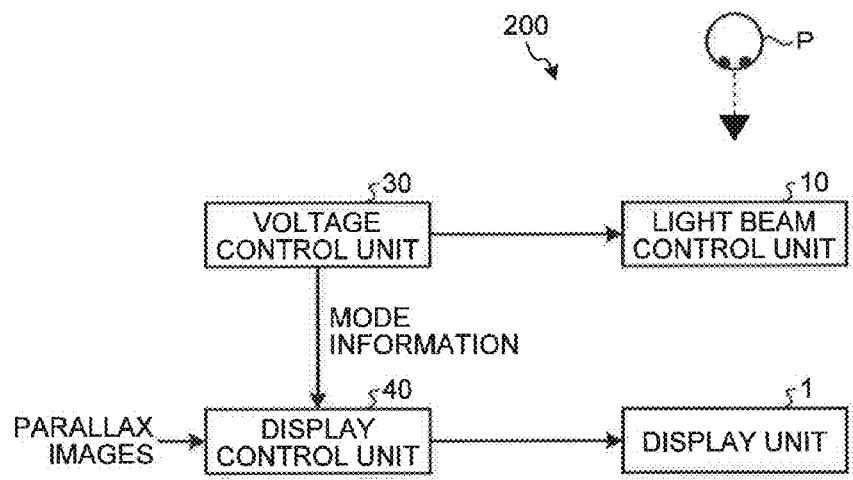
FIG. 12 is a block diagram illustrating an image display device.

FIG. 12 is a block diagram illustrating an example or an image display device 200 according to the second embodiment. Herein, the image display device 200 is capable of displaying planar images (two-dimensional pictures) too, and can switch between displaying three-dimensional pictures and displaying two-dimensional pictures.

As illustrated in FIG. 12, the image display device 200 includes the display unit 1, a light beam control unit 10, a voltage control unit 30, and a display control unit 40. An observer P can recognize three-dimensional pictures by observing parallax images, which are displayed on the display unit 1, via the light beam control unit 10.

The light beam control unit 10 is configured with a liquid crystal GRIN lens array in which the refractive index distribution changes according to the voltage applied thereto. The light beams falling on the light beam control unit 10 from the display unit 1 are emitted in the direction corresponding to the refractive index distribution of the light beam control unit 10. A specific configuration of the light beam control unit 10 is described later in detail.

The voltage control unit 30 controls the voltage that is applied to the light beam control unit 10. In the second embodiment, the voltage control unit 30 receives an input specifying a mode that indicates the type of display of three-dimensional pictures (i.e., the type of the refractive index distribution of the light beam control unit 10), and performs mode setting according to the received input. Then, depending on the mode that has been set; the voltage control unit 30 controls, in a variable manner, the voltage applied to the light beam control unit 10. Moreover, the voltage control unit 30 sends mode information, which indicates the mode that has been set, to the display control unit 40. Herein, the first mode and the second mode are examples of the modes. As compared to the first mode, the second mode has a greater visible area angle as well as a greater parallax count. The visible area angle points to the angle at which the observer can observe three-dimensional pictures. Meanwhile, it is possible to implement any arbitrary method to set the modes. For example, the configuration can be such that the mode is switched in an automatic manner depending on the number of people observing three-dimensional pictures.

The display control unit 40 controls the display unit 1 to display images (for example, parallax images). In the second embodiment, the display control unit 40 refers to the mode information received from the voltage control unit 30; obtains the images (for example, parallax images) that are to be displayed in the mode specified in the mode information; and controls the display unit 1 to display the images that are obtained.

Figure 13:
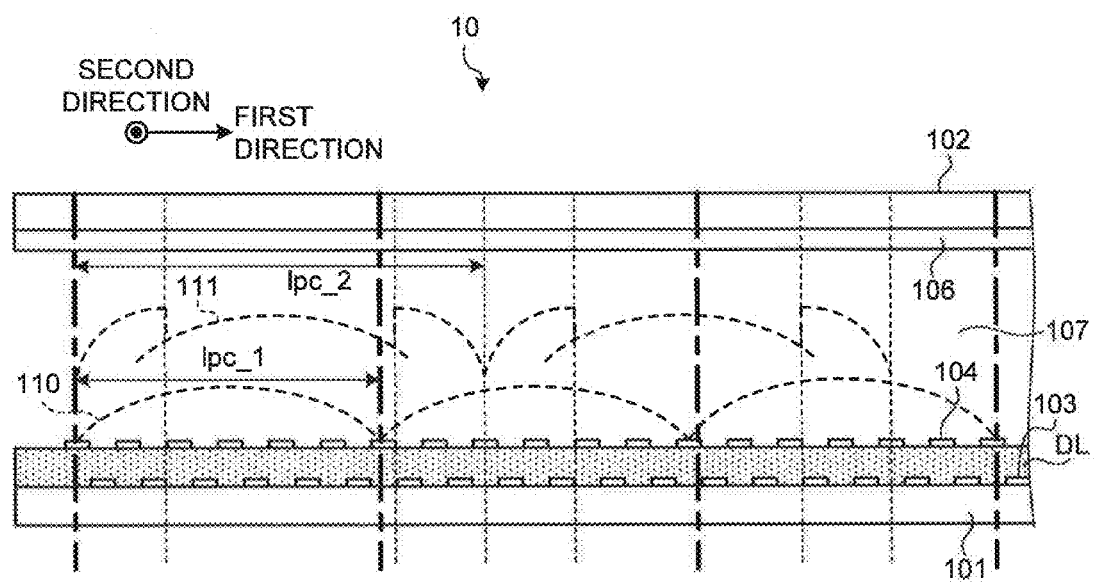
FIG. 13 is a diagram illustrating an example of a cross-sectional surface of the light beam control unit.

FIG. 13 is a diagram illustrating an example of a cross-sectional surface of the light beam control unit 10. As illustrated in FIG. 13, the light beam control unit 10 includes a transparent first substrate 101, a transparent second substrate 102 that is positioned facing the first substrate 101, and a liquid crystal layer 107 that is sandwiched between the first substrate 101 and the second substrate 102. On that surface of the first substrate 101 which is on the side of the liquid crystal layer 107 is formed a plurality of first-type electrodes 103 that are transparent in nature. Moreover, on that surface of the first substrate 101 which is on the side of the liquid crystal layer 107, each first-type electrode 103 is formed to extend in a third direction making an angle θ that is smaller than 90° with the second direction. Thus, when observation is done from the normal line direction of the first substrate 101, each first-type electrode 103 is positioned, to extend in an oblique direction.

The first-type electrodes 103 are covered by a dielectric layer DL, and a plurality of second-type electrodes 104 is formed on the upper surface of the dielectric layer DL. On the upper surface of the dielectric layer DL, each second-type electrode 104 is formed to extend in a third direction making an angle θ that is equal to or smaller than 90° with the second direction. In the example illustrated in FIG. 13, the first-type electrodes 103 and the second-type electrodes 104 are arranged at the same pitch (i.e., the same width in the first direction). When observation is done from the normal line direction of the first substrate 101, the arrangement is such that each first-type electrode 103 is positioned in between two neighboring second-type electrodes 104.

On that surface of the second substrate 102 which is on the side of the liquid crystal layer 107, a transparent opposite electrode 106 is formed across the entire surface. The opposite electrode 106 faces each first-type electrode 103 as well as each second-type electrode 104. The voltage value supplied to each of the first-type electrodes 103, each of the second-type electrodes 104, and the opposite electrode 106 is controlled by the voltage control unit 30. The liquid crystal layer 107 contains liquid crystal molecules and a dispersion medium for dispersing those liquid crystal molecules. In the second embodiment, as an example of the liquid crystal modules, a uniaxial birefringent material is used.

Herein, by taking into account the fact that the electrode pattern is fixed, the simplest configuration for switching the parallax count N is the configuration in which the tilt θ (=arctan(1/n)) of the liquid crystal GRIN lenses, which function as the light beam control elements for emitting light beams, is kept fixed, and the lens pitch in the first direction (the first pitch L1) of the liquid crystal lenses is changed. In the second embodiment, in the case of the first mode, the voltage control unit 30 controls the voltage applied to each electrode in such a way that a first refractive index distribution, which acts as a first lens 110 that has ridge lines extending in a third direction which makes an angle θ with the second direction and that has the lens pitch (the first pitch L1) in the first direction equal to lpc_1, is distributed on a periodic basis along the first direction. In the example illustrated in FIG. 13, the first lens 110 formed in the first mode is assumed to be a single lens (or can also be regarded as a Fresnel lens having the level difference count equal to zero). However, that is not the only possible case.

In the case of the second mode, the voltage control unit 30 controls the voltage applied to each electrode in such a way that a second refractive index distribution, which acts as a second lens 111 that has ridge lines extending in a third direction which makes an angle θ with the second direction and that has the lens pitch in the first direction equal to lpc_2 (>lpc_1), is distributed on a periodic basis along the first direction. In the example illustrated in FIG. 13, the second lens 111 formed in the second mode is assumed to be a single lens (or can also be regarded as a Fresnel lens having the level difference count equal to one (a single-level lens). However, that is not the only possible case.

As can be understood from FIG. 8, if the tilt coefficient n is constant, the relationship between the first pitch L1 and the second pitch L2 can expressed in the form of a straight line. That is, if the tilt coefficient n is constant, the value of the second pitch L2 gets uniquely defined according to the value of the first pitch L1. In order to switch between the modes by chancing the parallax count N (i.e., by changing the first pitch L1) while keeping a fixed tilt of the liquid crystal GRIN lenses that function as light beam control elements, as well as in order to achieve color arrays superior in isotropic nature; such a condition can be selected in which the straight line that is defined by the condition of the tilt coefficient n being constant cuts across two areas having superior isotropic nature (for example, cuts across areas for which the evaluation value is equal to or smaller than 3.5).

In essence, in each of the first mode and the second mode, the first pitch L1 and the second pitch L2 of the liquid crystal GRIN lenses formed in that mode have values which ensure that the triangles that are viewed through the liquid crystal GRIN lenses formed in that mode (i.e. viewed through the first lens 110 or the second lens 111) and that are obtained by joining the nearest sub-pixels having same colors are close to equilateral triangles. Hence, in each of the first mode and the second mode, it becomes possible to achieve color arrays having superior isotropic nature. For example, in each of the first mode and the second mode, it is possible either select such a combination of the first pitch L1 and the second pitch L2 for which the evaluation value is equal to or smaller than 3.5; or select such a combination of the first pitch L1 and the second pitch L2 for which the evaluation value is equal to or smaller than 3.4; or select, such a combination of the first pitch L1 and the second pitch L2 for which the evaluation value is equal to or smaller than 3.3; or select such a combination of the first pitch L1 and the second pitch L2 for which the evaluation value is equal to or smaller than 3.25.

Moreover, for example, in each of the first mode and the second mode, the first pitch L1 and the second pitch L2 of the liquid crystal GRIN lenses formed in that mode have values which ensure that the triangles that are viewed through the liquid crystal GRIN lenses formed in that mode and that are obtained by joining the nearest sub-pixels having same colors are close to equilateral triangles; as well as, in an identical manner to the first embodiment, the first pitch L1 of the liquid crystal GRIN lenses formed in that mode can be equal to or greater than 5/s (preferably, equal to or greater than 7/s) (where, "s" represents the number of sub-pixels included in the pixels along the first direction that constitute a single pixel) of the third pitch pp (the pitch of the pixels 4). Hence, in each of the first mode and the second mode, it becomes possible to separate off the horizontal parallaxes to a sufficient extent while achieving color arrays having superior isotropic nature. Furthermore, in an identical manner to the first embodiment, in each of the first mode and the second mode, the first pitch L1 and the second pitch L2 of the liquid crystal GRIN lenses formed in that mode can have values that make n×m (m=1, 2, 3) a non-integer. With that, in each of the first mode and the second mode, it becomes possible to avoid the occurrence of moire.

Figure 14:
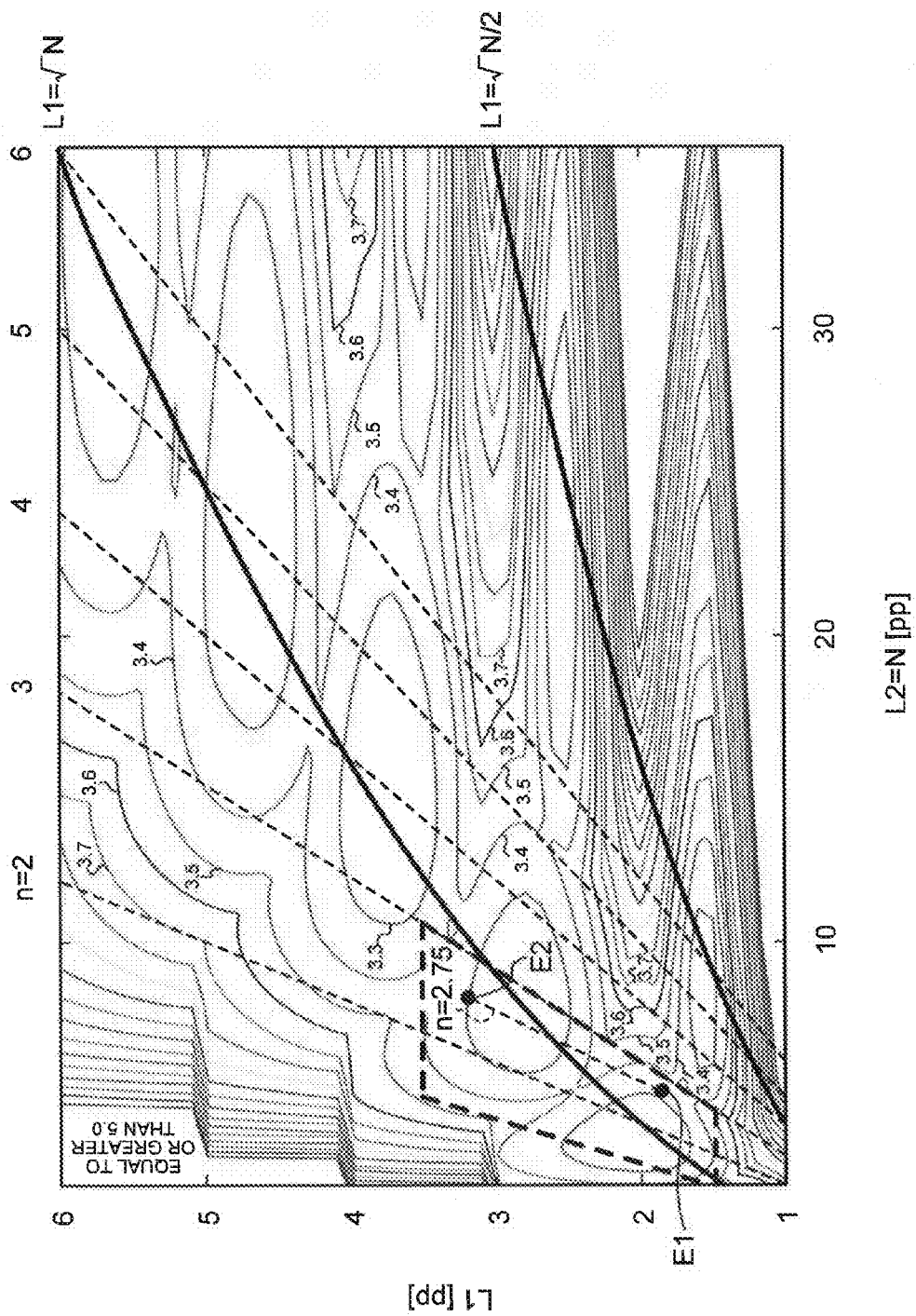
FIG. 14 is a diagram for explaining lens pitches in each of two modes.

Given below is the explanation with reference to appropriate specific examples. For example, as illustrated in FIG. 14, under a design condition in which 1.5≤n≤3.0 as well as 1.67≤L1≤3.5 is satisfied; from among the points that correspond to any of the values within the range of 1.5≤n≤3.0 (n=constant) and that are present on a straight line which represents the relationship between L1 and L2, any arbitrary two points corresponding to such a combination of L1 and L2 for which the evaluation value is equal to or smaller than 3.5 (or, for example, equal to or smaller than 3.4 or equal to or smaller than 3.3) can be selected as the combination of the first pitch L1 and the second pitch L2 in each of the first mode and the second mode. Moreover, in this example, when there are three sub-pixels in the first direction that constitute a pixel (i.e., when s=3), the first pitch L1 in each mode is equal to or greater than 5/s of the third pitch pp. Hence, in each of the first mode and the second mode, it becomes possible to separate off the horizontal parallaxes while achieving color arrays having superior isotropic nature.

Consider a configuration in which, on the display unit a liquid crystal GRIN lens array designed with the following conditions is superposed: intervals D1 equal to 0.45 (with "pp" as the unit) in the first direction (the horizontal direction) of the electrodes formed on the first substrate 101; intervals D2 of equal to 1.2735 (with "pp" as the unit) in the second direction (the vertical direction) of the electrodes formed on the first substrate 101; and the tilt coefficient n of 2.75. In that, configuration, the voltage applied to the electrodes was adjusted and a switching display was performed for the following two conditions: a condition of 4.95 parallax in which n=2.75 does not change and in which a combination (E1 illustrated in FIG. 14) of the first pitch L1=1.8 (=D1×4) and the second pitch L2 (parallax count N)=4.95 is selected; and a condition of 8.66 parallax in which n=2.75 does not change and in which a combination (E2 illustrated in FIG. 14) of the first pitch L1=3.15 (=D1×7) and the second pitch L2=8.66 is selected. It was found that both the conditions had superior isotropic nature.

Figure 15:
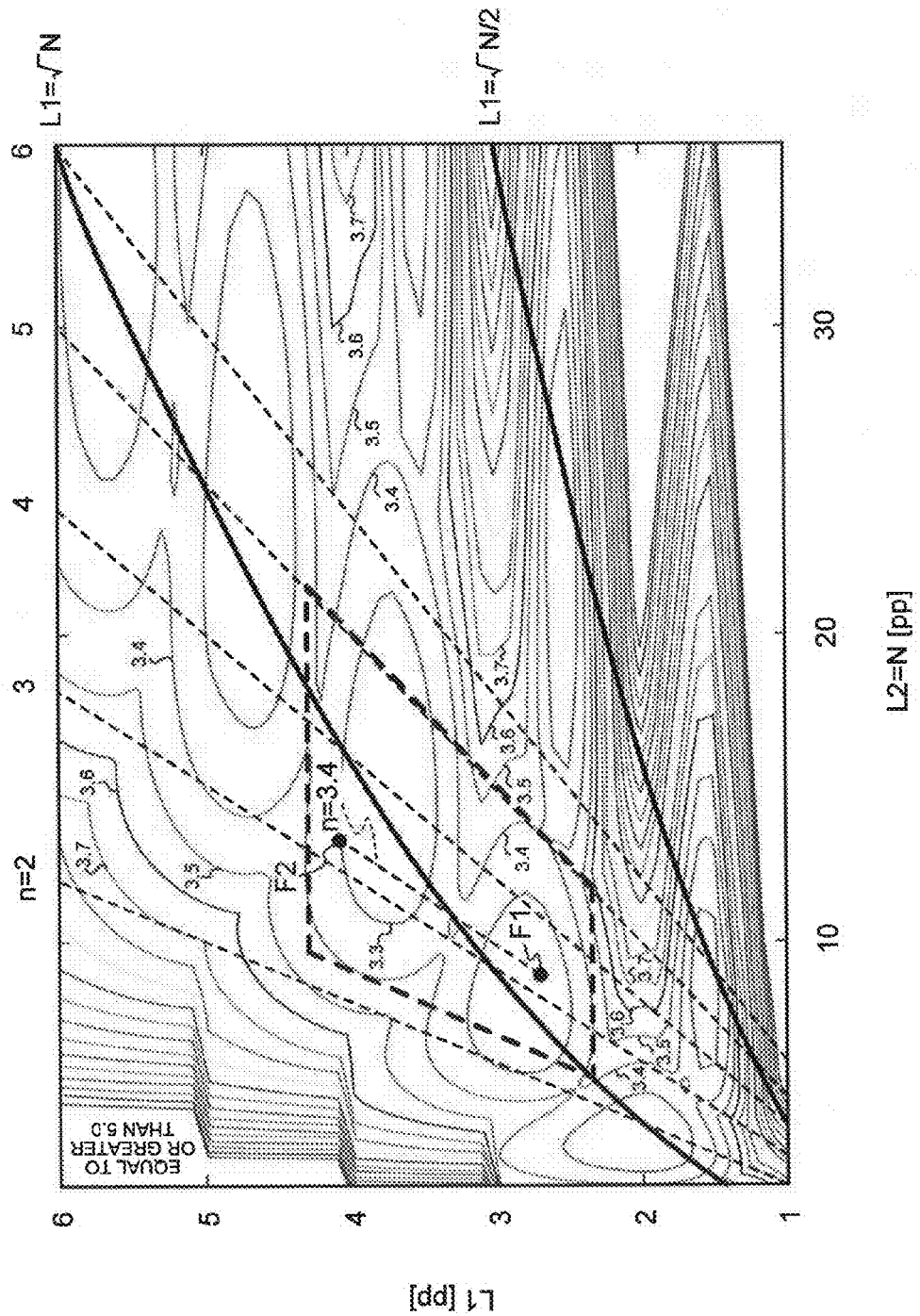
FIG. 15 is a anagram for explaining lens pitches in each of two modes.

For example, as illustrated in FIG. 15, under a design condition in which 2.3≤n≤5.0 as well as 2.33≤L1≤4.3 is satisfied; from among the points that correspond to any of the values within the range of 2.3≤n≤5.0 (n=constant) and that are present on a straight line which represents the relationship between L1 and L2, any arbitrary two points corresponding to such a combination of L1 and L2 for which the evaluation value is equal to or smaller than 3.5 (or, for example, equal to or smaller than 3.4 or equal to or smaller than 3.3) can be selected as the combination of the first pitch L1 and the second pitch L2 in each of the first mode and the second mode. Moreover, in this example, when there are three sub-pixels in the first direction that constitute a pixel (i.e., when s=3), the first pitch L1 in each mode is set to equal to or greater than 7/s of the third pitch pp. Hence, in each of the first node and the second mode, it becomes possible to provide the continuous kinematic parallax while achieving color arrays having superior isotropic nature.

Consider a configuration in which, on the display unit 1, a liquid crystal GRIN lens array designed with the following conditions is superposed: electrode intervals D1 equal to 1.35 in the first direction; electrode intervals D2 equal to 4.59 in the second direction; and the tilt coefficient n of 3.4. In that configuration, the voltage applied to the electrodes was adjusted and a switching display was performed for the following two condition: a condition of 9.18 parallax in which n=3.4 does not change and in which a combination (F1 illustrated in FIG. 15) of the first pitch L1=2.7 (=D1×2) and the second pitch L2 (parallax count N)=9.18 is selected; and a condition of 13.77 parallax in which n=3.4 does not change and in which a combination (F2 illustrated in FIG. 15) of the first pitch L1=4.05 (=D1×3) and the second pitch L2=13.77 is selected. It was found that both the conditions had superior isotropic nature.

Figure 16:
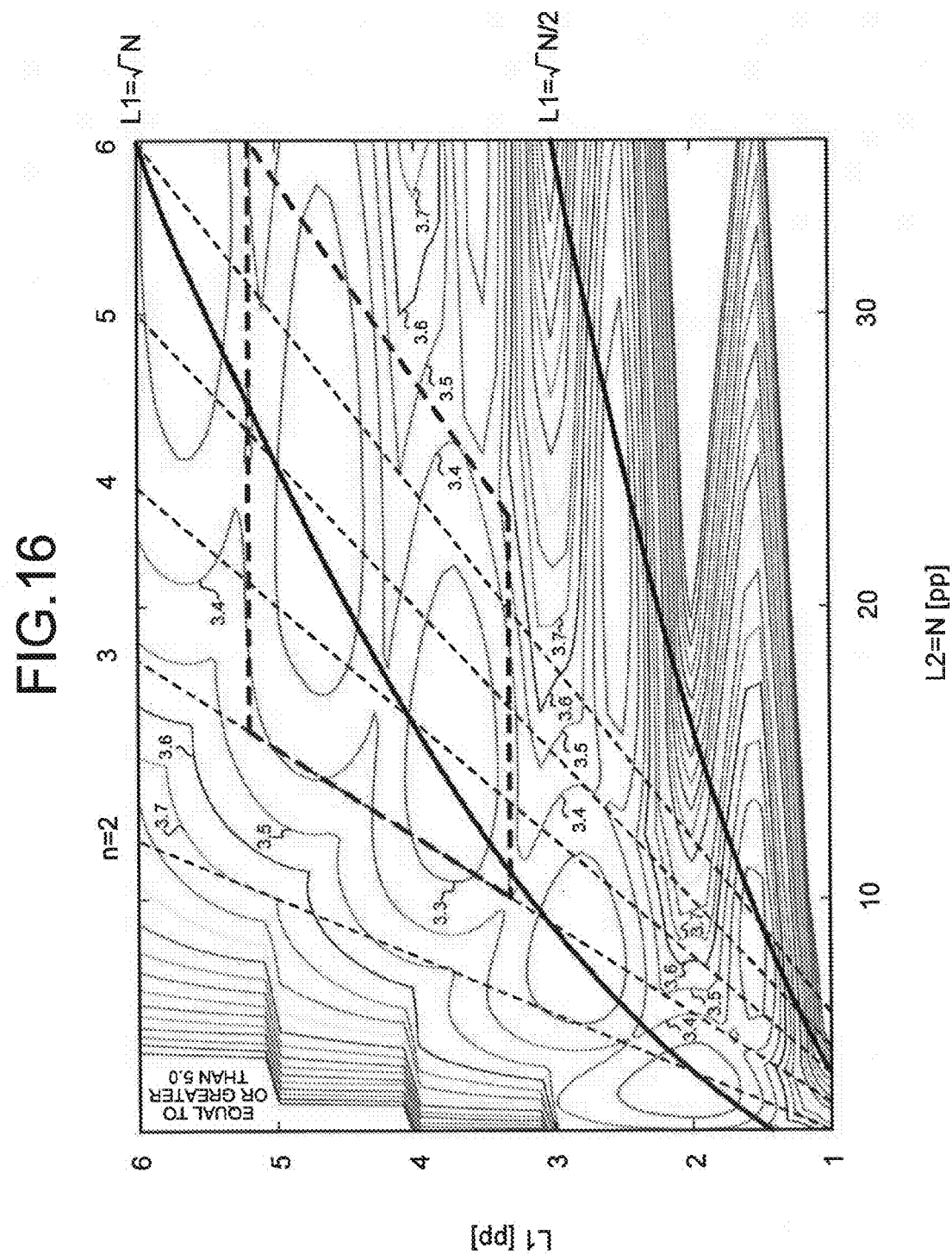
FIG. 16 is a diagram for explaining lens pitches in each of two modes.

For example, as illustrated in FIG. 16, under a design condition in which 3.0≤n≤6.8 as well as 3.3≤L1≤5.3 is satisfied; from among the points that correspond to any of the values within the range of 3.0≤n≤6.8 (n=constant) and that are present on a straight line which represents the relationship between L1 and L2, any arbitrary two points corresponding to such a combination of L1 and L2 for which the evaluation value is equal to or smaller than 3.5 (or, for example, equal to or smaller than 3.4 or equal to or smaller than 3.3) can be selected as the combination of the first pitch L1 and the second pitch L2 in each of the first mode and the second mode. Moreover, in this example, when there are three sub-pixels in the first direction that constitute a pixel (i.e., when s=3), the first pitch L1 in each mode is set to equal to or greater than 7/s of the third pitch pp. Hence, in each of the first mode and the second mode, it becomes possible to provide the continuous kinematic parallax while achieving color arrays having superior isotropic nature.

Figure 17:
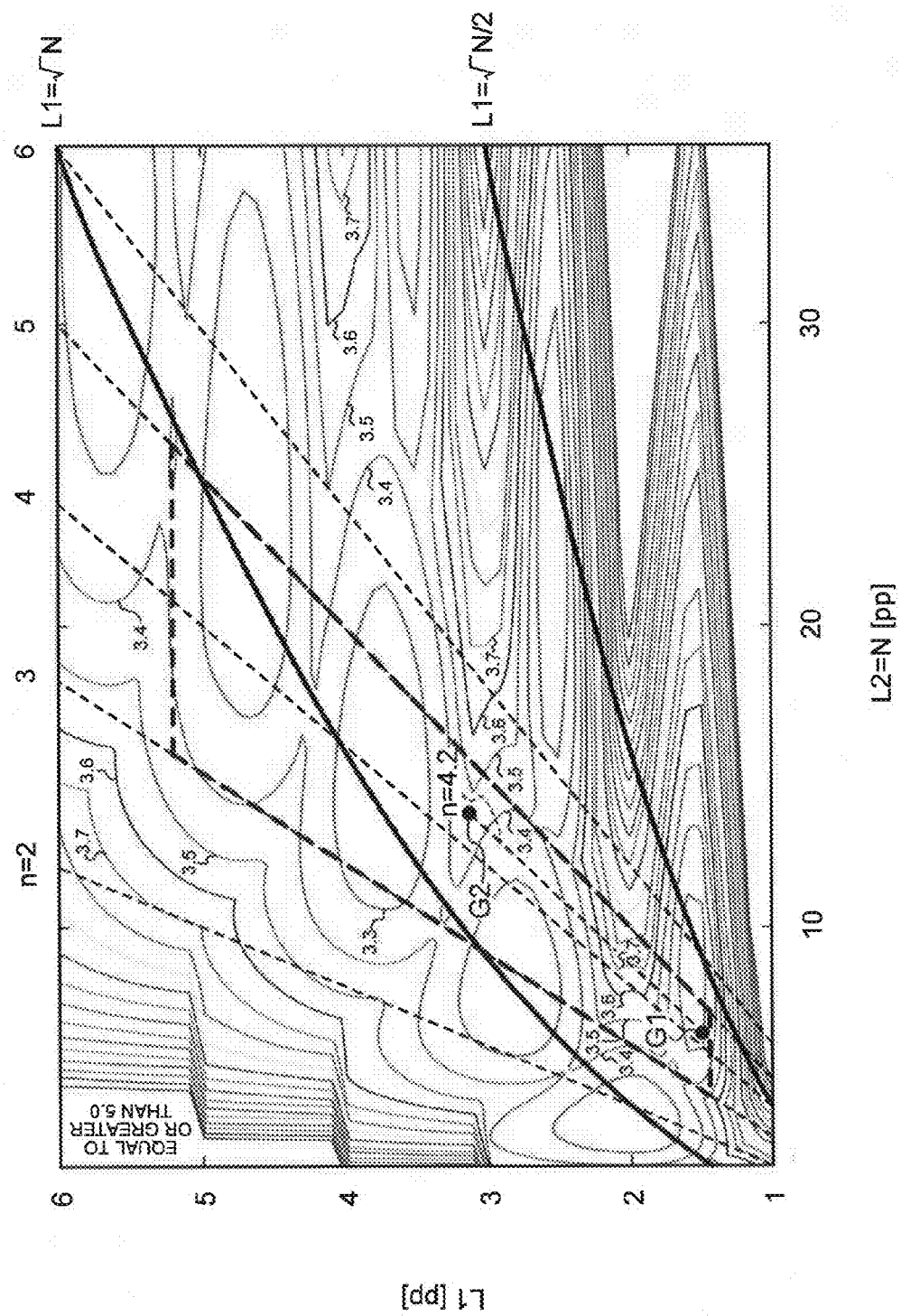
FIG. 17 is a diagram for explaining lens pitches in each of two modes.

For example, as illustrated in FIG. 17, under a design condition in which 3.0≤n≤5.0 as well as 1.3≤L1≤5.2 is satisfied; from among the points that correspond to any of the values within the range of 3.0≤n≤5.0 (n=constant) and that are present on a straight line which represents the relationship between L1 and L2, any arbitrary two points corresponding to such a combination of L1 and L2 for which the evaluation value is equal to or smaller than 3.5 (or, for example, equal to or smaller than 3.4 or equal to or smaller than 3.3) can be selected as the combination of the first pitch L1 and the second pitch L2 in each of the first mode and the second mode. With that, in each of the first mode and the second mode, it becomes possible to achieve color arrays having superior isotropic nature.

Consider a configuration in which, on the display unit 1, a liquid crystal GRIN lens array designed with the following conditions is superposed: electrode intervals D1 equal to 0.44 in the first direction; electrode intervals D2 equal to 1.86 in the second direction; and the tilt coefficient n of 4.2. In that configuration, the voltage applied to the electrodes was adjusted and a switching display was performed for the following two conditions: a condition of 5.60 parallax in which n=4.2 does not change and in which a combination (G1 illustrated in FIG. 1) of the first pitch L1=1.33 D1×3) and the second pitch L2 (parallax count N)=5.60 is selected; and a condition of 13.07 parallax in which n=4.2 does not change and in which a combination (G2 illustrated in FIG. 17) of the first pitch L1=3.11 (=D1×7) and the second pitch L2=13.07 is selected. It was found that both the conditions had superior isotropic nature.

Figure 18:
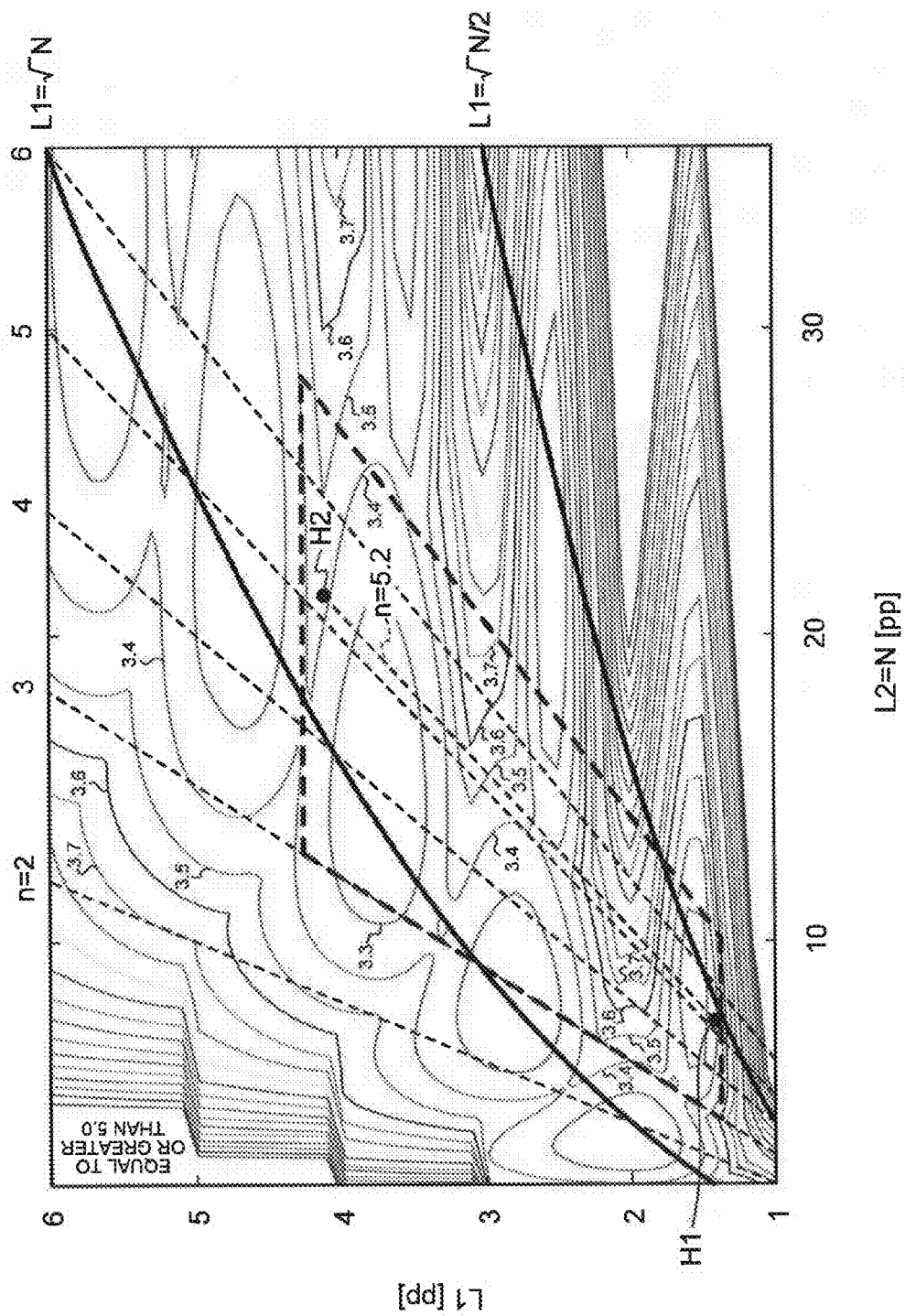
FIG. 18 is a diagram for explaining lens pitches in each of two modes.

For example, as illustrated in FIG. 18, under a design condition in which $3.0 \leq n \leq 6.8$ as well as $1.3 \leq L1 \leq 4.3$ is satisfied; from among the points that correspond to any of the values within the range of $3.0 \leq n \leq 6.8$ (n=constant) and that are present on a straight line which represents the relationship between L1 and L2, any arbitrary two points corresponding to such a combination of L1 and L2 for which the evaluation value is equal to or smaller than 3.5 (or, for example, equal to or smaller than 3.4 or equal to or smaller than 3.3) can be selected as the combination of the first pitch L1 and the second pitch L2 in each of the first mode and the second mode. With that, in each of the first mode and the second mode, it becomes possible to achieve color arrays having superior isotropic nature.

Consider a configuration in which, on the display unit 1, a liquid crystal GRIN lens array designed with the following conditions is superposed: electrode intervals D1 equal to 1.35 in the first direction; electrode intervals D2 equal to 7.02 in the second direction; and the tilt coefficient n of 5.2. In that configuration, the voltage applied to the electrodes was adjusted and a switching display was performed for the following two conditions: a condition of 7.02 parallax in which n=5.2 does not change and in which a combination (H1 illustrated in FIG. 18) of the first pitch L1=1.35 (=D1×1) and the second pitch L2 (parallax count N)=7.02 is selected; and a condition of 21.06 parallax in which n=5.2 does not change and in which a combination (H2 illustrated in FIG. 18) of the first pitch L1=4.05 (=D1×3) and the second pitch L2=21.06 is selected. It was found that both the conditions had superior isotropic nature.

For example, as illustrated in FIG. 19, under a design condition in which $5.0 \leq n \leq 8.0$ as well as $1.3 \leq L1 \leq 2.7$ is satisfied; from among the points that correspond to any of the values within the range of $5.0 \leq n \leq 8.0$ (n=constant) and that are present on a straight line which represents the relationship between L1 and L2, any arbitrary two points corresponding to such a combination of L1 and L2 for which the evaluation value is equal to or smaller than 3.5 (or, for example, equal to or smaller than 3.4 or equal to or smaller than 3.3) can be selected as the combination of the first pitch L1 and the second pitch L2 in each of the first mode and the second mode. With that, in each of the fir at mode and the second mode, it becomes possible to achieve color arrays having superior isotropic nature.

As described above, the image display device according to the second embodiment includes a display unit, a light beam control unit, and a voltage control unit. The light beam control unit includes a refractive index modulation layer in which the refractive index distribution changes according to the applied voltage; and includes a plurality of electrodes used in applying a voltage to the refractive index modulation layer. The light beam control unit is positioned facing the display unit. In the second embodiment, the explanation is given for an example in which the liquid crystal layer 107 is used as the refractive index modulation layer in which the refractive index distribution changes according to the applied voltage. However, that is not the only possible case. Alternatively, for example, it is also possible to use a birefringent polymer can also be used the refractive index modulation layer. In essence, in the refractive index modulation layer, as long as the refractive index distribution changes according to the applied voltage; it serves the purpose.

In the case of the first mode, the voltage control unit controls the voltage to be applied to the electrodes in such a way that a first refractive index distribution, which acts as a first lens that extends in a third direction making an angle θ equal to or smaller than 90° with the second direction, is distributed on a periodic basis along the first direction. Moreover, in the case of the second mode in which the parallax count is greater than in the first mode, the voltage control unit controls the voltage applied to the electrodes in such a way that a second refractive index distribution, which acts as a second lens that extends in a third direction making an angle θ equal to or smaller than 90° with the second direction and that has a greater lens pitch in the first direction than the first lens, is distributed on a periodic basis along the first direction.

Then, in each of the first mode and the second mode, the pitch in the first direction and the pitch in the second direction of lenses formed in that mode can have values which ensure that the triangles that are viewed through the lenses formed in that mode and that are obtained by joining the nearest sub-pixels having same colors are close to equilateral triangles. With that, in each of the first mode and the second mode, it becomes possible to achieve color arrays having superior isotropic nature.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display device comprising:
   a display unit that
      includes pixels, each of which includes a plurality of sub-pixels having different colors, arranged in a matrix in a first direction and in a second direction orthogonal to the first direction, and
      displays a plurality of parallax images having parallax with respect to each other; and
   a light beam controller that
      faces the display unit,
      includes light beam control elements arranged on a periodic basis at a first pitch in the first direction and at a second pitch in the second direction, each fight beam control element extending in a third direction making an angle smaller than 90° with the second direction, and
      is configured to be capable of controlling a direction of light beams emitted from the display unit, wherein
         each width of the pixels in the first direction and in the second direction is equal,
         the first pitch and the second pitch are configured to make a triangle observed through the light beam control elements, the triangle being obtained by joining the nearest sub-pixels having the same color,
         the first pitch and the second pitch have values for which an evaluation value, which is obtained by dividing a perimeter that indicates a length of an outer circumference of the triangle by a power of ½ of a parallax count, is equal to or smaller than 3.5, when "s" represents the number of the sub-pixels included in the pixels along the first direction, the first pitch is equal to or greater than 5/s of a third pitch of each pixel, and the perimeter is calculated by defining the third pitch as 1.

2. The device according to claim 1, wherein the first pitch and the second pitch have values which make a result of multiplication of a tilt coefficient with each of the integers 1 to 3 a non-integer, the tilt coefficient being expressed as a ratio of the first pitch to the second pitch and indicating a tilt of the light beam control elements with respect to the display.

3. The device according to claim 1, wherein the evaluation value of the first pitch and the second pitch is equal to or smaller than 3.4.

4. The device according to claim 1, wherein the evaluation value of the first pitch and the second is equal to or smaller than 3.3.

5. The device according to claim 1, wherein the evaluation value of the first pitch and the second is equal to or smaller than 3.25.

6. The device according to claim 1, wherein the first pitch is equal to or greater than 7/s of the third pitch.

* * * * *